United States Patent [19]

Platus

[11] Patent Number: 5,310,157
[45] Date of Patent: May 10, 1994

[54] VIBRATION ISOLATION SYSTEM

[75] Inventor: David L. Platus, Los Angeles, Calif.

[73] Assignee: Minus K Technology, Inc., Inglewood, Calif.

[21] Appl. No.: 17,139

[22] Filed: Feb. 12, 1993

Related U.S. Application Data

[63] Continuation-in-part of Ser. No. 941,758, Sep. 4, 1992, abandoned, which is a continuation of Ser. No. 395,093, Aug. 16, 1989, abandoned.

[51] Int. Cl.⁵ .......................................... F18M 13/00
[52] U.S. Cl. .................................................... 248/619
[58] Field of Search .............. 248/619, 603, 604, 620, 248/593, 562, 632

[56] References Cited

U.S. PATENT DOCUMENTS

| | | | |
|---|---|---|---|
| 1,545,540 | 7/1925 | Wills | 248/619 |
| 2,313,893 | 3/1943 | Rushing | 248/619 X |
| 2,572,919 | 10/1951 | French et al. | 248/619 X |
| 2,580,815 | 1/1952 | Mooney et al. | |
| 2,756,952 | 7/1956 | Gazley | 248/567 |
| 2,924,420 | 2/1960 | Fink | |
| 2,932,482 | 5/1960 | Dickie | 248/619 |
| 2,941,777 | 6/1960 | Aller et al. | 248/358 |
| 3,028,138 | 4/1962 | Wells | 248/619 |
| 3,080,160 | 3/1963 | Orner | 267/160 |
| 3,223,400 | 12/1965 | Deister, Sr. | 248/619 X |
| 3,447,671 | 6/1969 | Schweinforth | 198/220 |
| 3,464,657 | 9/1969 | Bullard | 248/550 |
| 3,465,997 | 9/1969 | Piske | 248/350 |
| 3,592,422 | 7/1971 | Paine et al. | 248/589 |
| 3,606,704 | 9/1971 | Denton | 248/619 X |
| 3,727,865 | 4/1973 | Melrose et al. | 248/632 |
| 3,952,979 | 4/1976 | Hansen | 248/550 |
| 4,101,102 | 7/1978 | Lloyd | 248/638 |
| 4,325,133 | 4/1982 | Reitmayer | 369/263 |
| 4,355,469 | 10/1982 | Nevins et al. | 248/604 X |
| 4,372,520 | 2/1983 | Shutt | 248/604 |
| 4,402,483 | 9/1983 | Kurabayashi et al. | 248/636 |
| 4,511,115 | 4/1985 | Ludwigsen | 248/562 |
| 4,537,382 | 8/1985 | Beck | 248/568 |
| 4,572,471 | 2/1986 | Schrepfer | 248/560 |
| 4,605,194 | 8/1986 | Binnig et al. | 248/559 |
| 4,643,385 | 2/1987 | Sandercock | 248/550 |
| 4,740,057 | 4/1988 | Dezso | 350/252 |
| 4,778,037 | 10/1988 | Papadopohlos | 248/603 X |

FOREIGN PATENT DOCUMENTS

| | | | |
|---|---|---|---|
| 58-28035 | 2/1983 | Japan | 248/620 |
| 0394969 | 7/1933 | United Kingdom | 248/620 |
| 476671 | 3/1937 | United Kingdom | |

OTHER PUBLICATIONS

Boeing Aerospace Report-Zero-G Ground Test Simulation Methods-Author Ikegami et al.

*Primary Examiner*—Ramon O. Ramirez
*Attorney, Agent, or Firm*—Fulwider Patton Lee & Utecht

[57] ABSTRACT

A vibration isolation system utilizes various configurations of elastic structures loaded to approach a point of elastic instability. In one form of the invention, the system uses a combination of a negative-stiffness mechanism and a positive spring to support a payload and provide low net stiffness in the vertical direction. Horizontal motion is generally isolated by utilizing one or more axially-symmetric columns loaded to approach their critical buckling loads to provide low stiffness in any horizontal direction.

38 Claims, 10 Drawing Sheets

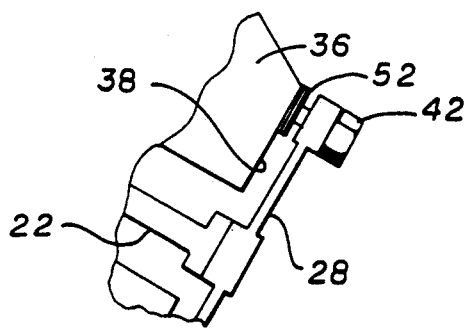
FIG. 8A
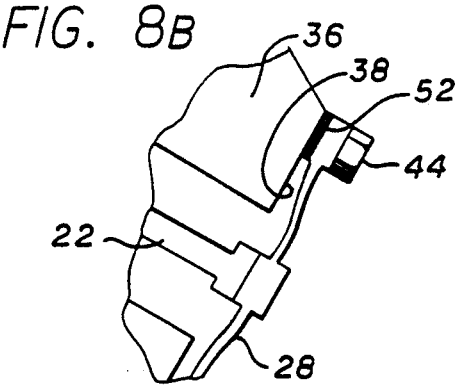
FIG. 8B
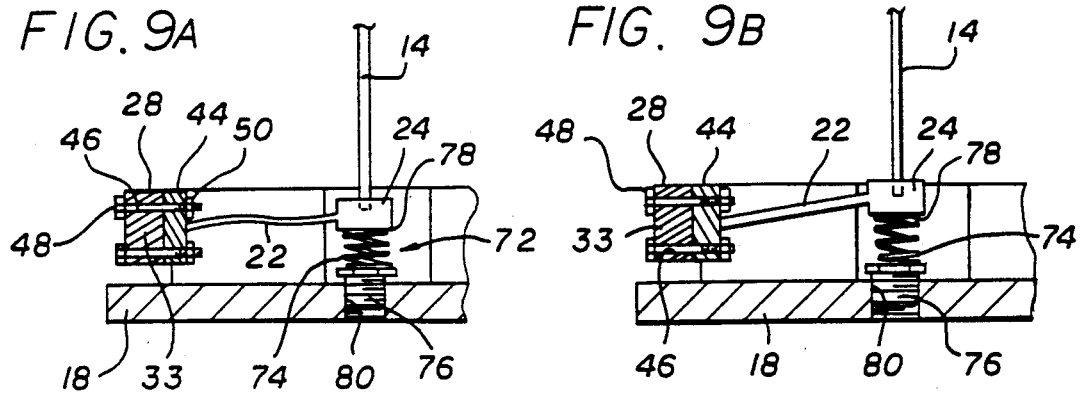
FIG. 9A
FIG. 9B
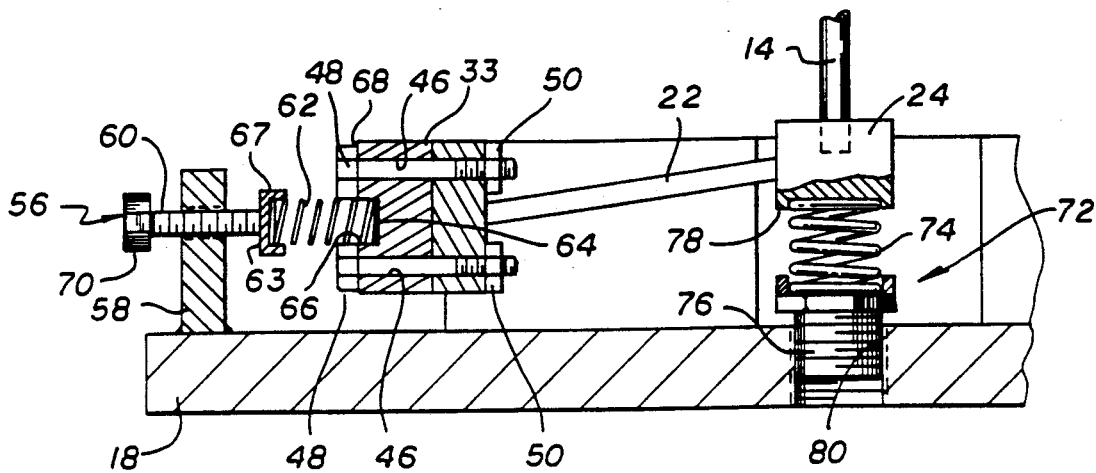
FIG. 10

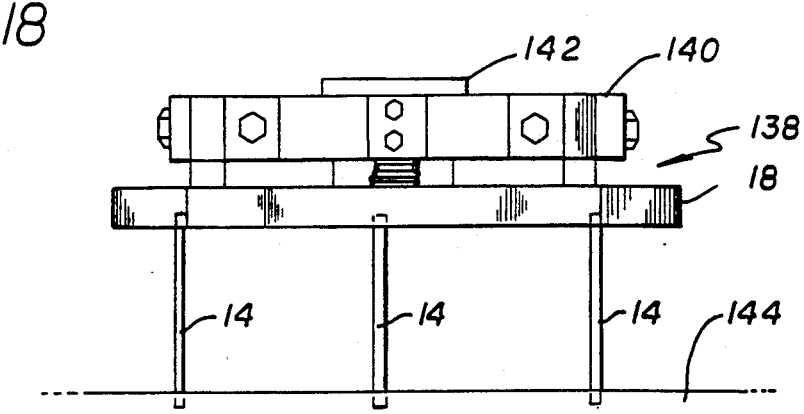
FIG. 18
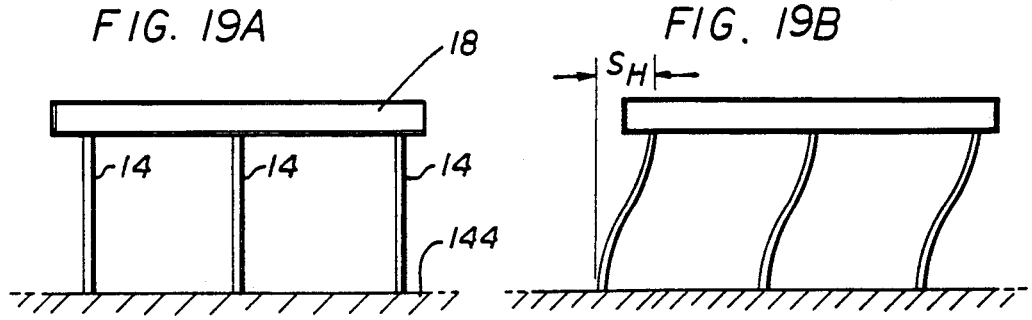
FIG. 19A
FIG. 19B
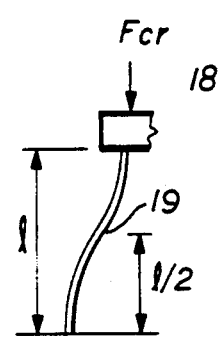
FIG. 19C
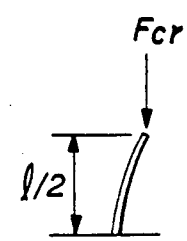
FIG. 19D
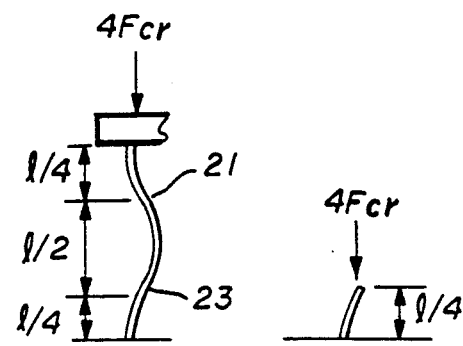
FIG. 19E
FIG. 19F

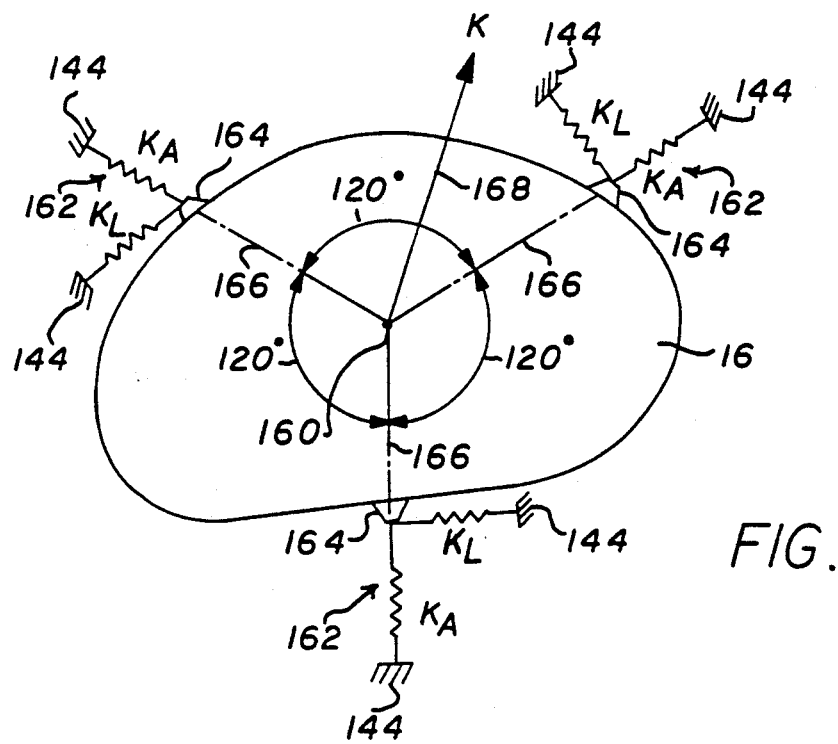
FIG. 22
FIG. 23
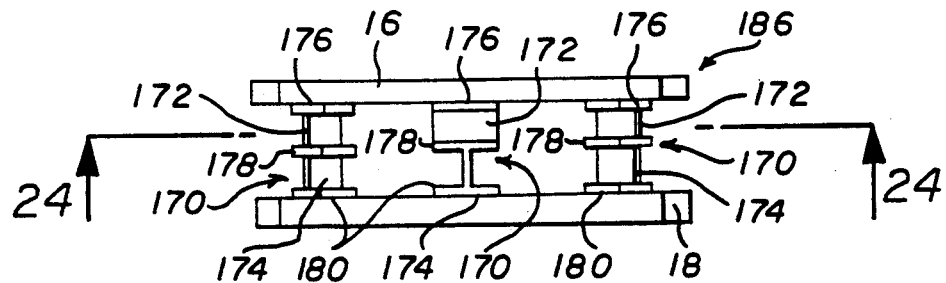
FIG. 24
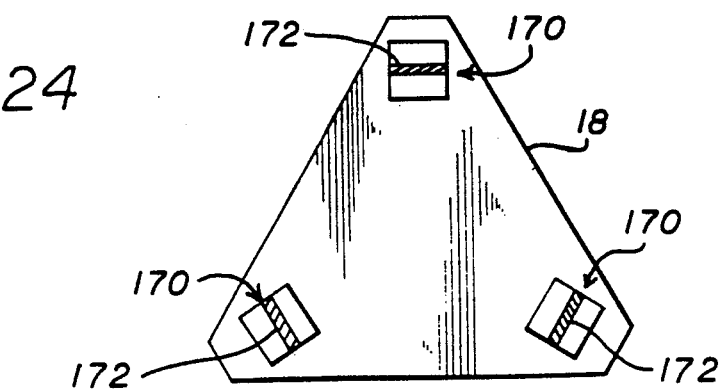

VIBRATION ISOLATION SYSTEM

This is a continuation-in-part of Ser. No. 07/941,758 filed Sep. 4, 1992 now abandoned which is a continuation of Ser. No. 07/395,093 filed on Aug. 16, 1993 now abandoned.

BACKGROUND OF THE INVENTION

1. Field of the Invention

The present invention relates generally to methods and apparatus for suspending an object having weight relative to a base, and for isolating or reducing the transmission of vibrations between the object and the base on which the apparatus is supported, and more particularly, to an omni-directional suspension or vibration-isolating system, which exhibits low stiffness both vertically in the direction of the weight load and horizontally in directions transverse to the weight load, to effectively reduce the transmission of vibrations between the object and the base.

The invention also relates to other applications such as simulating a zero-gravity environment or for optical pointing or measurement systems or any system where it is desirable to provide small motions of a suspended object without resistance from spring forces or mechanical friction.

2. Description of Related Art

Much work and development have been directed to the problem of effectively isolating or reducing the effects of unwanted environmental vibrations on motion-sensitive devices such as machines and instruments. When transmitted to motion-sensitive devices through the foundation or structure of a building, or through the ground itself, environmental vibrations can adversely affect the testing, calibration, and performance of these devices. Road and rail traffic, for example, provide an ample source of unwanted vibrations. Also, micro-seismic ground motions are always present, even in remote areas.

A building itself can also generate and transmit unwanted vibration to the sensitive equipment located within it. For example, seismic activity or wind conditions around the building can cause it to vibrate. Since such motion can be further amplified on the upper floors of a multi-story building, sensitive equipment is often placed on lower floors or on slabs or seismic masses isolated from the rest of the building and resting on or isolated from the soil itself. Additionally, unwanted vibrations can be generated throughout the building by its heating, ventilating and air conditioning system. Foot traffic of workers and other machinery are still further examples of sources of vibrations that can adversely affect the performance of motion-sensitive equipment.

Vibrations can also cause problems outside of the setting of the conventional workplace. For example, noisy equipment on submarines can be transmitted to the hull, causing it to vibrate and transmit acoustic or vibrational energy through the water, making the submarines more susceptible to detection.

Earthquakes can also cause buildings and other equipment to fail by exciting vibrations in the buildings or equipment at their natural frequencies coinciding with frequencies of the ground motions.

Numerous devices have been developed for reducing the transmission of unwanted vibrations between an object and its surroundings. These devices, commonly called vibration isolators, are designed as a support structure that can be placed between the object to be isolated and the foundation. Isolators exhibit stiffnesses or spring rates such that objects supported on them have natural frequencies of vibration substantially lower than the frequencies of the unwanted vibrations. Generally, the higher the frequencies of the unwanted vibrations relative to the natural frequencies of the object supported on the isolators, the more effective the isolators in isolating these vibrations.

The measure of the ability of an isolator to either amplify or suppress an input vibration is called the transmissibility of the isolator. Transmissibility is defined, for a vibrating foundation, by the ratio of the response amplitude of the isolated object to the excitation amplitude of the foundation, or, for a vibrating object, by the ratio of the amplitude of the force transmitted to the foundation to the amplitude of the exciting force on the object.

FIG. 25 shows curves of transmissibility vs. frequency ratio for an ideal single-degree-of-freedom isolation system consisting of a rigid payload supported on an isolator consisting of a linear spring and a viscous damper. The various curves correspond to various amounts of damping. The frequency ratio is the ratio of excitation frequency to natural frequency. These curves show that such an isolator amplifies the vibrations for frequency ratios below about 1.4 and isolates the vibrations for higher frequency ratios, with greater isolation for greater frequency ratios. That is, for a given frequency of vibration, lower natural frequencies of the system result in better isolation. Also, the curves show that for a given frequency of vibration and a given frequency of the system, lower damping results in better isolation, although damping is often required to limit the resonant amplification.

Transmissibility curves for real isolators follow the curves of FIG. 25 quite well until excitation frequencies increase to the point where isolator resonances or surge frequencies occur. That is, at sufficiently high frequencies the isolators resonate or vibrate at their own natural frequencies, so transmissibility curves of real isolators look like that of FIG. 26 which is typical of a mechanical spring. Isolator resonances occur because isolators have mass as well as stiffness and, in general, for a given isolator stiffness a greater isolator mass will result in lower isolator resonances. It is apparent from FIGS. 25 and 26 that, for a given frequency of excitation, isolation is improved by reducing the isolator stiffness, and therefore the system natural frequency, as much as possible while keeping the isolator resonances above the frequency of excitation. In general this results in conflicting requirements for isolator designs in the prior art. With linear springs, for example, as the spring stiffness is reduced, the deflection under the payload weight increases, with an accompanying increase in stored elastic energy. Since springs can only store a limited amount of energy per unit mass of spring and remain elastic, increased energy storage requirements for the spring increases its required mass and reduces its resonant frequencies. Therefore, prior art isolators generally have a limited separation between the lowest isolation system natural frequencies attainable and the highest isolator resonant frequencies attainable.

Unwanted vibrations occur in a wide range of frequencies and amplitudes and there is increasing use of extremely motion-sensitive instruments and equipment that needs to be isolated from these vibrations in frequency ranges and amplitudes where prior art isolators are not effective. Typical applications include microelectronics manufacturing, machining to extreme tolerances and industrial laser and optical systems.

High-frequency vibrations produced by machinery, for example, can be effectively isolated by a variety of prior art isolation system techniques such as resilient pads made from of a variety of materials and various types of mechanical springs. When vibration input frequencies are very low, such as 5 Hz or lower, the choices of prior art solutions become much more limited, particularly when the vibration amplitudes are very small, such as a micro-g of acceleration or a micron of displacement.

Air springs are typically used where the lowest frequencies and highest isolation performance are required, but they have limitations. The lowest natural frequencies of typical high-performance air springs are limited to about 1.0–1.5 Hz and even higher, particularly with micro-motion inputs. Also, high-performance air springs have other problems, namely, they leak, they require air or power supplies and leveling valves which can be a maintenance nuisance and they can contaminate clean rooms and generally cannot be used in hard vacuums.

Accordingly, those concerned with the development and use of vibration isolation systems and apparatus have long recognized the need for improved vibration isolation, particularly in the low frequency ranges. Preferably, an improved device should be compact and relatively light in weight and should provide improved vibration isolation at low and high frequencies in both vertical and horizontal directions. Also, such a system or apparatus should be able to isolate vibrations of extremely small amplitude, such as micro-seismic motions, without significant loss of performance.

SUMMARY OF THE INVENTION

Briefly, and in general terms, the present invention provides a versatile vibration isolation system that exhibits low stiffness, which can be made as low as zero or near zero, both vertically and horizontally, to provide vibration isolation capabilities in all directions. The system offers a substantial improvement over most current state-of-the-art isolation systems in reducing transmission of vibrations to sensitive instruments and equipment, particularly those vibrations with very low frequencies and very small amplitudes. The system is capable of isolating vibrations below one Hertz while still effectively isolating vibrations as high as 100 Hertz.

The vibration isolation system of the present invention utilizes various configurations of elastic structures that can be loaded to approach a point of elastic instability. The elastic instability associated with each configuration has an instability mode shape or buckling mode into which the structure deforms as it goes unstable or buckles. Right at the instability point, where the load causing the instability is right at the so-called "critical buckling load", the structure can be given a small deflection into the buckled shape with essentially zero resisting force, or zero spring rate. If the instability-producing load is slightly below the critical buckling load, the structure can be given a small deflection into the instability mode shape with very little resisting force thereby exhibiting very low stiffness. The magnitude of the stiffness depends on how closely the instability point is approached. It is this principle that is used in the present invention to create zero or near-zero stiffness.

If the load causing the instability is greater than the critical buckling load, then as the structure deforms into the buckled shape, the excess load will tend to propel the structure into the buckled shape creating a negative-stiffness or negative-spring-rate mechanism. A common example is the "snap-through" or "over-center" mechanism. By combining a negative-stiffness mechanism with a positive spring, adjusted so that the positive and negative stiffnesses just cancel, or nearly cancel, the resulting device can be placed at a point of elastic instability and will exhibit zero or near-zero stiffness for small deflections around a center-point or center position where the structure goes from its unbuckled to its buckled shape or from its initial shape to its instability mode shape. This principal is also used in the present invention. Further, by controlling the magnitude of the load causing the negative stiffness, a means is created by which the net stiffness of the device can be adjusted or "fine-tuned" either manually, for adjusting a passive isolation system, or automatically in an active isolation system using motion sensing elements, a feed-back loop, and an actuating means for adjusting the instability-producing load and the system stiffness. This invention also uses, in some embodiments, means for adjusting the positive spring stiffness in order to adjust the net stiffness of the system.

The vibration isolation system of the present invention utilizes a combination of a vertical-motion isolation system that supports the weight of the object and provides low stiffness in the vertical direction, and a horizontal-motion isolation system, operatively connected vertically in series with the vertical-motion isolation system, that also supports the object and provides low stiffness in any horizontal direction.

The vertical-motion isolation system utilizes a configuration of one or more isolators that produce an instability mode shape such that the associated deflections are uniaxial, that is, they occur in only one direction. For vibration isolation applications where an object is supported in a gravity field, this axis of the isolator corresponding to the instability direction is aligned vertically in the direction of the weight load. The load-supporting capability of these isolators is also adjustable.

This invention also utilizes a more general isolator or suspension device that supports a force in an axial direction and can provide positive or negative stiffness in the axial direction or in lateral directions transverse to the axis of the isolator. The axial stiffness and axial force capability are adjustable. In a more general application of this invention, a system of such isolators can be used in an active system to support an object having mass, where the direction of gravity or other acceleration field is changing, or the magnitude of the acceleration field is changing as in the case of isolating noisy equipment in a moving submarine or an optical pointing system in a moving vehicle. By appropriately changing the load-supporting capability of the individual isolators, the isolation system can adjust for the changing acceleration field and still provide the zero or near-zero spring rates.

The horizontal-motion isolation system utilizes a configuration of one or more horizontal-motion isolators that produce a structure having many elastic instability or buckling modes that are symmetric about a vertical axis. In one form of the invention, the horizontal-motion isolation system utilizes one or more axially-symmetric column members that behave as fixed-free columns. Each column member, and the resulting system, has many instability modes (theoretically, an infinite number) such that the initial shape of the instability mode or buckling mode is a lateral displacement of the upper end of the column relative to the lower end. Each column member is designed to support a portion of a payload weight that can approach the critical buckling load of that member. As a result, each column member cooperates to provide sufficient axial stiffness in supporting the payload weight yet can provide little or no stiffness in any horizontal direction.

The horizontal-motion isolator can be designed to approach its critical buckling load to whatever extent is needed based on the design requirements and constraints. If space constraints dictate a small isolator height and small column length, and very low stiffness is required, the column can be designed so that the weight it supports closely approaches its critical buckling load. If space constraints are not important, for many applications adequately low stiffness can be achieved with longer columns where the supported weight is a small fraction of the column critical buckling load. This latter design has the advantage that horizontal stiffness is less sensitive to change in weight load.

In one embodiment, three or more vertical-motion isolators are used to create a three-point or multi-point support system. Each vertical-motion isolator utilizes a spring means having positive stiffness and a negative-stiffness mechanism that counteracts the positive spring stiffness. Each vertical-motion isolator also includes means for adjusting the negative stiffness and a means for adjusting the load-carrying capacity of the isolator.

By using this combination of positive spring and negative-stiffness mechanism to cancel the positive stiffness and produce low net vertical stiffness, which can be made as low as zero or near zero, a relatively stiff, compact and light-weight spring can be used to support the payload weight, compared with prior art linear isolator springs that are not even capable of producing the same low vertical natural frequencies. This novel arrangement results in a relatively compact, light-weight vertical-motion isolation system, whose isolator resonances are much higher than those of prior art linear isolation systems. Also, because the column members that make up the horizontal-motion isolation systems are quite stiff in the vertical direction, and deflections under lateral bending due to the horizontal vibrations are very small, these members store relatively little elastic energy and also have low mass and high isolator resonances.

The above-described novel combination of vertical-motion and horizontal-motion isolators can take on a number of different forms. In one embodiment of the invention, each vertical-motion isolator is used as a base support for supporting the payload and the horizontal-motion isolators. Each vertical-motion directly supports one end of one of the horizontal-motion column isolators along its centroidal axis in the vertical direction. The other end of each horizontal-motion column isolator contacts and supports the payload.

In this embodiment, the isolation system horizontal-motion force center is below the tops of the columns some distance that depends on the length of the columns and the horizontal natural frequency. For optimum performance it is important that the center of mass of the payload (and payload platform if it is used) be close to the isolation system horizontal-motion force center in order to avoid translational-rotational coupling and a possible destabilizing effect.

In another embodiment of the isolation system, the same vertical-motion isolators can again used as base supports except each isolator directly supports an intermediate platform. This intermediate platform is used as a foundation for supporting the horizontal-motion isolators, which are vertically disposed on this intermediate platform in order to support the payload. Each horizontal-motion isolator can also be designed to support a load that can approach its critical buckling load in order to produce very low horizontal natural frequencies. Utilizing this intermediate platform eliminates the need to affix the horizontal-motion isolators directly on the vertical-motion isolators. This reduces the bending moments transmitted by the horizontal-motion isolators to the vertical-motion isolators which could adversely affect their performance. The isolation system horizontal-motion force center in this embodiment is also below the tops of the columns as in the previously-described embodiment. The center of mass of the payload should also be located near the horizontal-motion force center in this embodiment for optimum performance.

Another different embodiment utilizes the horizontal-motion isolators, rather than vertical-motion isolators, as base supports. In this form, each vertical-motion isolator is placed on a platform or other support structure. The vertical-motion isolators in turn directly support the object to be isolated. The horizontal-motion isolators are vertically disposed between this platform and the foundation to support each vertical-motion isolator, the platform, and the object to be isolated. Again, an intermediate platform could be used to support the object and distribute its weight to the vertical-motion isolators.

These are just a few of the many different forms that the present invention can take utilizing this novel combination of vertical-motion and horizontal-motion isolators. Of course, other combinations are possible and would be within the spirit and scope of the present invention.

The present invention is also directed to the individual isolators that provide low stiffness in the vertical direction. In one embodiment of the invention, the spring means consists of at least two flexures that extend radially outward from a center hub on the axis of the isolator, 180° apart, and are supported at their outer ends by a means that is capable of applying an inward compressive radial force to the flexures. In one form of the invention, three radial flexures are utilized, each radial flexure being disposed 120° from the other, and connected at their inner ends to the center hub and at their outer ends to an inward-radial-force-producing-and-support means. In their unloaded state, before the payload is supported on the center hub, the inner ends of the radial flexures are higher than the outer ends. When the design payload weight is supported, the flexures deform and the center hub is deflected downward until the inner ends of the radial flexures are at the same vertical position as the outer ends of the flexures. This is the approximate operating position or center point of the isolator. The negative-stiffness mechanism consists of the same radial flexures and the inward-radial-force-producing means. When an inward radial force is applied to the outer end of each radial flexure, an over-center or snap-through mechanism is produced. That is, as the center hub is deflected up or down from the center point, a negative stiffness is produced by the action of the inward compressive radial forces. This negative stiffness counteracts the positive stiffness that results from bending deformation of the radial flexures so that the net vertical stiffness of the vertical-motion isolator can be reduced to a low value.

In another form of the invention, an outer loading flexure assembly is placed in contact with the outer end of the radial flexure. This loading flexure assembly is attached to a stationary base and is adapted to move either towards or away from the radial flexure to vary the load on the radial flexure. The loading flexure assembly can be either a separate piece attached to the radial flexure or it can be machined with the radial flexure as a single piece.

In one embodiment of the invention, the loading flexures are placed horizontally with the radial flexures to create a low profile mechanism. Another form of the invention utilizes vertical loading flexures which extend upward and have one end attached to a floating spacer block. The amount of radial force produced by these vertical loading flexures can also be varied by simply moving the loading flexure either toward or away from the radial flexure.

The vertical-motion isolation system also includes means for changing the load-carrying capacity of each vertical-motion isolator and the position of the payload relative to the base. One means of achieving this is to support part of the payload weight on a secondary linear spring whose deflection and loading can be independently adjusted. The secondary spring is effectively connected between the payload and the base in series with a means for changing the deflected length of the spring such as a screw-type actuator or a piezoelectric translator. The spring means in the isolator is now the combined spring means of the radial flexures and the secondary spring. When the isolator is adjusted to its operating point, corresponding to the center point of the negative-stiffness mechanism, the spring means is deflected a particular amount and is supporting a particular weight load. If, now, the weight load were to increase, for example, the spring means would deflect an additional amount and the payload would move toward the base away from the center-point position. With sufficient increase in weight load, the isolator would displace beyond the position it could effectively operate. However, by using the actuator to produce additional deflection of the secondary spring and increase the load carried by the secondary spring, the payload can be restored to its center-point position, thereby permitting the isolator to carry the additional load and continue to operate about its center point position. In this manner, the load-carrying capacity and the position of the payload relative to the base can be changed without changing the effective stiffness of the isolator. Other means for changing the load-carrying capacity of the isolator and the position of the payload relative to the base include alternative adjustable means for providing secondary support of the payload such as a solenoid or voice coil.

The secondary spring can support any fraction of the weight load. The particular case where it supports all of the weight load represents another embodiment of this invention. In this case, the radial flexure spring means contributes to the vertical stiffness but supports no vertical load. It is undeformed at the center point position where the inner and outer ends of the radial flexures are at approximately the same vertical position. The function of the radial flexures in this case is, along with the loading flexures, to provide the negative-stiffness mechanism. Various support springs can be used such as helical springs, rubber springs and pneumatic springs.

The combination of a vertical-motion isolator, as previously described, with means having relatively low lateral stiffness, such as a flexible column, provides a versatile isolator or suspension device that can be used in any orientation. This isolator can support a force in the axial direction and can provide positive or negative stiffness in the axial direction and in lateral directions transverse to the isolator axis. Also, the isolator can be designed to maintain a particular axial position or axial length for varying axial force, and the axial stiffness can be adjusted using the adjustment means previously described. The present invention utilizes this isolator with a principle, described below, to provide another embodiment of a versatile isolation system that can isolate an object when the system orientation is changing relative to gravity or other acceleration field. Examples are the isolation of noisy equipment in a moving submarine or an optical pointing system in a moving vehicle. According to this principle, a suspension system comprising an object suspended in a plane on three such isolators, spaced 120° apart and oriented so that their axes lie in the plane and intersect at a common point, will have the same stiffness in any direction in the plane. An active isolation system configured from such isolators can be used to isolate an object with respect to a moving base, and maintain the position of the object with respect to the base, while still providing very low isolation system stiffness in any direction. Three of these isolators could be used for the horizontal motion isolation system, and three of these isolators could be used for the vertical-motion isolation system.

The present invention is also directed to the isolators that provide low stiffness in the horizontal directions. In one form of this invention, the horizontal-motion isolation system utilizes at least three column members that are vertically disposed to support a payload. The upper end of each column member is rigidly attached to the payload or to an intermediate platform, and the lower end is rigidly attached to a vertical-motion isolation member, to an intermediate platform or to the base or foundation. Each column member is located relative to the center of mass of the supported weight to support a portion of the weight that can approach the critical buckling load of that member. The combination of these column members adequately supports the payload over the foundation while providing little or no horizontal stiffness. As a result, horizontal vibrations are isolated by these column members thus preventing their transmission between the payload and the foundation.

This horizontal-motion isolation system further includes means for preventing the column members from collapsing or being overstressed if load on a member exceeds the critical buckling load. Means, such as horizontal stops that limit the horizontal displacements to relatively small values, will prevent collapse or overstressing. When the stops limit the relative horizontal displacement, an approximate four-fold increase in load is required to cause buckling or collapse since the instability mode is changed. Therefore, a satisfactory safety factor against collapse or damaging over-stressing is provided. This will be explained further below with the aid of the drawings. Of course, the system would be designed to operate normally within horizontal displacement limits without contacting the stops. This would be accomplished by designing the system to keep the critical buckling loads from being exceeded.

One form of means for limiting horizontal displacement is embodied in a preventive stop that partially surrounds each column member and partially limits relative horizontal displacement once contact has been made between the column member and the stop. Alternatively, positive mechanical stops can be placed near the payload or intermediate platform to limit its horizontal displacements, or rotations about a vertical axis.

The horizontal-motion isolation system can also include means for changing the critical buckling strength of each column member in order to change its horizontal stiffness. One means of achieving this is by changing the effective column length. Another means for changing the buckling strength is by utilizing tubular column members filled with pressurized hydraulic fluid, and changing the hydraulic pressure with a piston-cylinder means or other pressure-changing means.

An alternative means for adjusting the horizontal stiffness of the column-member isolators is by adjusting the weight load carried by each column member. This is accomplished by supporting part of the weight load on a secondary spring with means for raising or lowering the base of the secondary spring in order to transfer weight between the secondary spring and the column members. Screw-type or other types of translators can be used. Since the secondary spring also has lateral stiffness or stiffness in horizontal directions, the column members are loaded above their critical buckling loads, thereby causing them to provide negative stiffness in the horizontal directions to counteract the positive stiffness of the secondary spring. Other adjustable means can also be used to support part of the payload weight such as solenoids and voice coils.

Another horizontal-motion isolation system utilizes three double flexures and the principle described earlier that three linear isolators oriented in a plane with axes passing through a common point, and spaced 120° apart, gives an isolation system with constant stiffness independent of direction in the plane. Each double flexure has two flexures in the form of thin flexible rectangular plates, one above the other and oriented vertically at right angles to one another and connected between three nearly rigid supporting plates. An upper supporting plate connects the upper flexure to an isolated payload platform, a middle supporting plate connects the two flexures and a lower supporting plate connects the lower flexure to the base. The flexures provide low stiffness in horizontal directions perpendicular to their planes, so they provide low stiffness in two mutually perpendicular directions, analogous to the general isolators described previously with an axial and a lateral stiffness. The double flexures also have an instability mode under vertical weight loading so that their stiffness can be reduced to arbitrarily low values by approaching their critical buckling strengths, analogous to the column-member isolators. Three double flexures, oriented 120° apart as described, provide an omni-directional horizontal-motion isolation system. The horizontal stiffness can be adjusted by adjusting the weight load carried by each flexure, using an adjustable secondary spring means to carry some of the payload weight, as previously described.

Belleville or coned-disk springs can be designed to support a weight and produce zero or negative stiffness in the vertical direction. However, they exhibit sliding mechanical friction which is detrimental to isolation of vibrations, particularly the most minute ambient vibrations due to micro-seismic activity. Another form of the present invention utilizes a Belleville or coned-disk spring in a novel way to provide a negative spring stiffness in conjunction with a positive spring means to support a payload and produce low spring stiffness in the vertical direction as well as low spring stiffness in any horizontal direction, and essentially free from mechanical friction. For some applications the vertical and horizontal stiffnesses can be made as low as zero or near zero. Two sets of column members support the Belleville spring between a payload and a base. An upper set of column members attaches to the payload and to the Belleville spring near its inner periphery and a lower set of column members attaches to the Belleville spring near its outer periphery and to the base. One set of column members is designed to operate near its critical buckling strength to produce low stiffness in any horizontal direction. Both sets of column members provide the positive spring means that counteracts the negative stiffness as the Belleville spring is deflected in the vertical direction, although most of the positive stiffness comes from the non-critical set of column members. The lengths of both sets of column members are adjustable. One set of adjustments changes the horizontal stiffness of the assembly and the other set of adjustments predominantly changes the vertical stiffness.

The present invention can be used, for example, to provide a stable platform for testing sensitive equipment or supporting precision manufacturing equipment. The system is suited for use with microelectronics fabrication and inspecting equipment, medical and industrial laser and optical systems, scanning and transmission electron microscopes, scanning probe microscopes, and many more practical applications such as isolating buildings or equipment from earthquakes. Since the isolation system is also capable of isolating vibrations of a payload, it can also be used to isolate a vibrating payload from the surrounding environment. One example of a practical application would be to isolate the vibrating equipment on a submarine to reduce the vibrations of the hull. Such a device would create a quieter running submarine which would be more difficult to detect. Additionally, since the vertical stiffness can be reduced to near zero, the isolator can stimulate zero gravity, thus making the present invention adaptable for testing instruments in a stimulated zero-gravity environment.

All in all, the present invention provides a system that is capable of low stiffness in both the vertical and any horizontal direction and also provides an isolation system that is capable of suppressing the transmission of low frequency vibrations between a payload and a base. The system that can be used passively, or with motion sensing elements, a feed-back loop and actuating means so it can be used as an active system. The invention also provides an isolation system that is essentially free from mechanical friction i.e., energy dissipation within the system is limited to internal hysteresis within the structural material. The system therefore effectively isolates payloads from even the most minute ambient vibrations. The system that can be constructed entirely from structural metals or other structural materials to resist adverse environments such as high temperatures, hard vacuums and corrosive environments.

Other features and advantages of the present invention will become apparent from the following detailed description, when taken in conjunction with the accompanying drawings, which illustrate, by way of example, the principles of the present invention.

BRIEF DESCRIPTION OF THE DRAWINGS

FIGS. 8(a) and 8(b) are partial fragmentary representations showing a loading flexure assembly in its loaded state in FIG. 8(b) and its unloaded state in FIG. 8(a);

FIGS. 9(a) and 9(b) are partial fragmentary representations showing a radial flexure in its loaded state in FIG. 9(a) and its unloaded state in FIG. 9(b);

FIG. 10 is a partial cross-sectional view showing the fine adjustment mechanism used to adjust the radial force on the radial flexure;

FIG. 18 is a side elevational view of the embodiment of a vibration isolation system made in accordance with the present invention;

FIG. 19(a) to (f) are elevation views of a horizontal-motion isolation system comprising three column members supporting a platform, illustrating instability modes of the column members. FIG. 19a shows the undisplaced system; FIGS. 19b and 19c illustrate the column member deformation mode under normal operation around the instability point; FIG. 19d shows an equivalent fixed-free column at the instability point; FIG. 19e shows the buckling mode of a column member with the platform constrained to small horizontal displacements; and FIG. 19f is the equivalent fixed-free column for the column member of FIG. 19e;

FIG. 22 is a plan view of a schematic arrangement showing another embodiment of a horizontal-motion isolation system made in accordance with the present invention;

FIG. 23 is a side view of another horizontal-motion isolation system using double flexures, made in accordance with the present invention.

FIG. 24 is a cross-sectional plan view showing the orientation of the three double flexures used in the horizontal-motion isolation system of FIG. 23 taken along line 24—24;

DETAILED DESCRIPTION OF THE PREFERRED EMBODIMENTS

Figure 1:
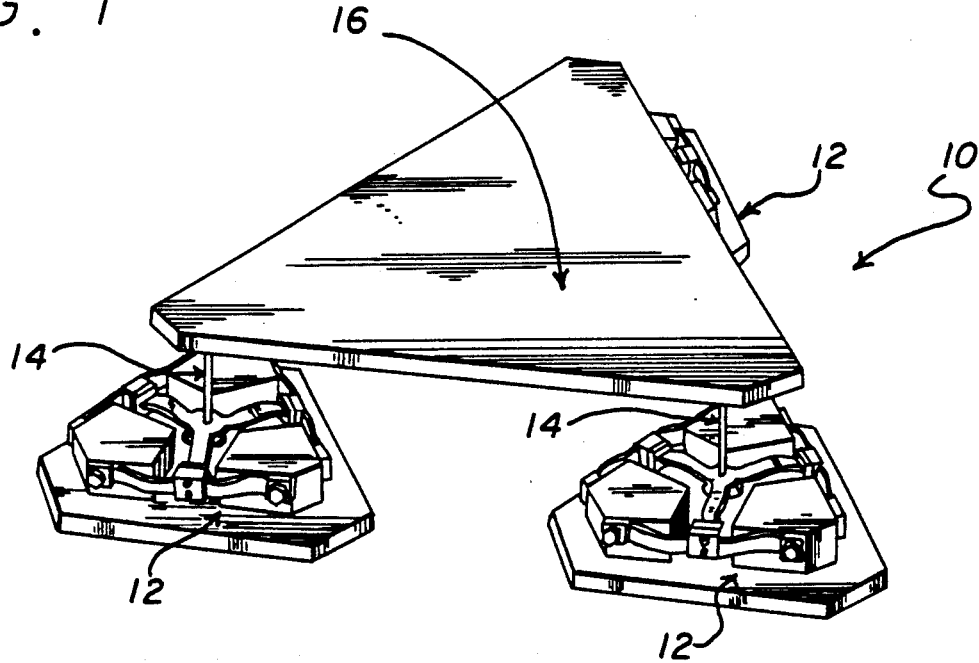
FIG. 1 is a perspective view of one embodiment of a vibration isolation system made in accordance with present invention.

As is shown in the drawings for the purpose of illustration, the present invention is embodied in an omnidirectional isolation system that is capable of effectively isolating an object, especially a motion-sensitive instrument, from the effects of vibrations and other undesirable motions, or isolating a vibrating object from a base. The invention is also directed to the individual vertical-motion and horizontal-motion isolators that cooperatively associate to form the isolation system.

FIG. 1 shows one embodiment of a vibration isolation system 10 made in accordance with the present invention. The system 10 utilizes several novel vertical-motion isolation apparatus or isolators 12 that are used to resiliently support the object to be isolated. These vertical-motion isolators (discussed in greater detail below) provide one means for suppressing the transmission of vibrations in the vertical direction.

These vertical-motion isolators 12 operate by utilizing a spring means, that supports the weight load, and a mechanism capable of producing negative stiffness that counter-acts the positive stiffness of the spring means. As a result, a low net stiffness can be achieved. Means for adjusting the negative stiffness are also provided to "fine tune" the isolator to obtain a particular low net spring stiffness, which can be made as low as low as zero or near zero. This combination produces a vertical-motion isolator that can isolate vibrations at very low-frequencies and improve the isolation at higher frequencies.

The system 10 combines the vertical-motion isolators 12 with one example of a novel horizontal-motion vibration isolation system that consists of at least three column members 14 (only two of which are shown in FIG. 1) that provide relatively stiff support in the vertical direction and resilient support in any horizontal direction. Each column member 14 is rigidly attached at its lower end to one of the vertical-motion isolators 12, and is rigidly attached at its upper end to the payload or to a platform that supports the payload. Each column member 14 can undergo a specific condition of unstable equilibrium when a certain vertical load is applied to the member. The critical value of this load is called the critical buckling load of the member. Once this load is imparted to the member, any additional load would cause the member to begin to buckle or deform into its buckled or instability mode shape. This is discussed further, below, with the aid of FIGS. 19a to 19f.

The objective of the deign is to load each of these three column members 14 axially with a weight that can approach the critical buckling load of the member. The member 14 will still be sufficiently sturdy to support the payload weight, however, there will be low stiffness in any horizontal direction for any of these members. As a result these members will suppress the transmission of horizontal vibrations between the payload and the base. Another feature of the present invention is a safety or "fail safe" mechanism (further discussed below) that allows the column member isolators to operate at or very near their instability points and provides a satisfactory safety factor against collapse or damage to the payload or the isolation system components. This combination of vertical-motion and horizontal-motion isolators creates a system capable of isolating vibrations in virtually any direction.

The particular arrangement of the vertical-motion and horizontal-motion isolators shown in FIG. 1 is just one of the numerous combinations that are possible under the present invention. For example, the system of FIG. 1 utilizes three vertical-motion isolators as base members that support a payload that includes the horizontal-motion isolation members 14, the platform 16 and the object to be isolated. Other combinations are also possible utilizing the horizontal-motion isolation members 14 as base members for supporting and isolating its payload. For example, in one such arrangement, shown in FIG. 18 and discussed in greater detail below, only one vertical-motion isolator is used and is supported by the three horizontal-motion isolation members. The number of vertical-motion isolators that are implemented may vary and their placement in relation to the horizontal-motion isolation members can take on many different combinations that are all within the scope and spirit of the present invention.

In practice, the horizontal-motion isolation system typically uses at least three horizontal-motion isolation members to properly support any object. In some applications, many more horizontal-motion isolation members may be used to provide the necessary support, and in other applications, only one horizontal-motion isolation member may be used.

In some isolation system embodiments in which nonuniform vertical displacements of the vertical-motion isolators causes tilt of the payload or payload platform and corresponding rotations of the upper ends of the column isolators relative to the lower ends, as in the system of FIG. 1, the location of the isolation system horizontal-motion force center is some distance below the tops of the columns. The isolation system horizontal-motion force center is the point through which application of a horizontal force on the system will cause the system to translate horizontally without tilt or rotation about a horizontal axis. It is important in these systems that the center of mass of the payload (and payload platform if it is used) supported on the columns be close to the horizontal-motion force center in order to achieve optimum performance and to avoid a possible destabilizing effect that could occur if the center of mass were too high above the horizontal-motion force center. For the system of FIG. 1, the approximate location of the horizontal-motion force center $L_{FS}$ relative to the tops of the columns depends on the system decoupled horizontal natural frequency $f_H$ (the system horizontal natural frequency when the center of mass is located at the horizontal-motion force center) and the column length L, and is given by $$L_{FS} = \frac{4.9}{f_H^2} + \frac{L}{2} \qquad (1)$$

where $L_{FS}$ and L are in inches and $f_H$ is in Hz. For example, for a 0.5 Hz system with a column length of 5 inches, $L_{FS}$ is 22 inches, so the center of mass should be located 22 inches below the tops of the columns. For that reason, means for lowering the center of mass, could be implemented, such as connected a weighted structure below the platform 16.

Figure 2:
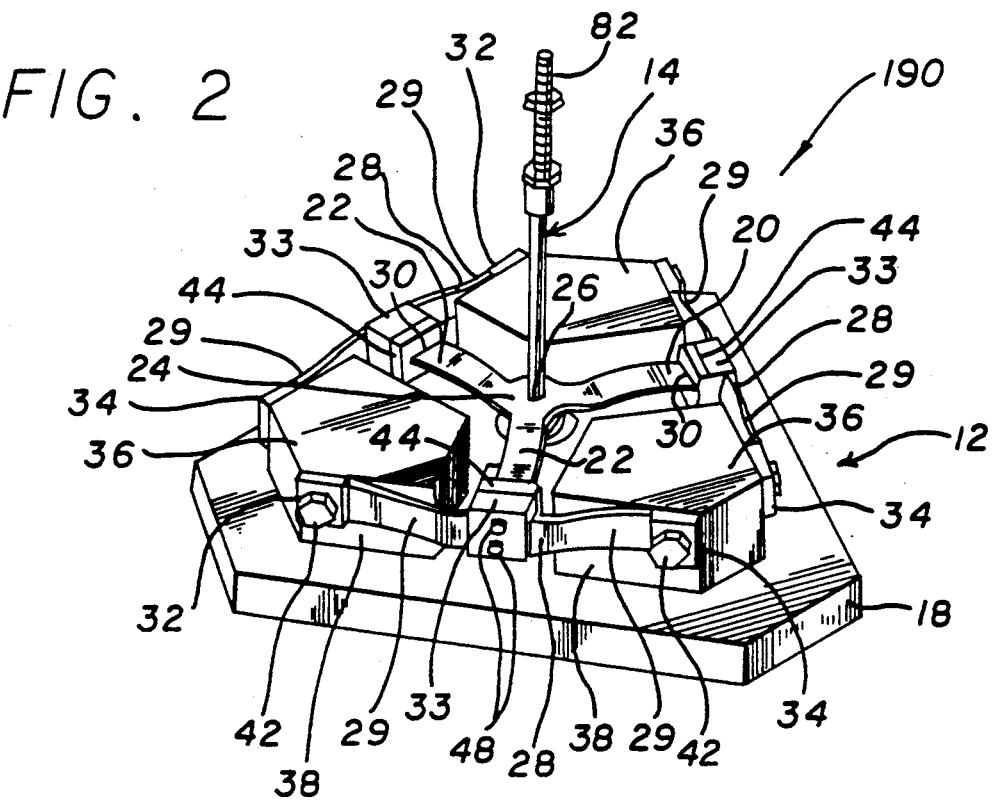
FIG. 2 is a perspective view of one embodiment of a general purpose isolator made in accordance with the present invention.

Referring now to FIGS. 2, 4, 5 and 6, one embodiment of a vertical-motion isolator 12 used in the system depicted in FIG. 1 is illustrated. In FIG. 2, the platform 16 has been removed to better show the components that make up this particular isolator.

The vertical-motion isolator 12 includes a stationary base 18 upon which a spring means 20 is mounted. This particular spring means 20 supports the weight load and provides a positive spring stiffness in the vertical direction. This spring means 20 includes three radial flexures 22 that are attached to each other at a central hub 24. This hub 24 acts as the central point that supports the object to be isolated. In this particular arrangement, the central hub 24 supports one end 26 of horizontal-motion isolation member 14. In other embodiments, the hub 24 can be attached to a support structure, such as a platform, which supports the isolated object, or alternatively, it can be attached to the object directly.

The three radial flexures 22 are spatially arranged from each other in approximate 120° orientation. Each radial flexure 22 acts as a beam-column having high axial stiffness but sufficient bending flexibility to permit it to bend or "flex" significantly when subjected to bending moments caused by vertical loads. This bending flexibility provides the positive vertical stiffness of the spring means.

Each radial flexure 22 is connected to means for providing compressive radial force on the flexure. In the embodiment shown in FIGS. 2, 4, 5 and 6, these means are shown as three loading flexure assemblies 28 one of which is connected to an outer end 30 of each radial flexure 22. Each loading flexure assembly 28 has two flexures 29 connected between a thickened center piece 33 and two thickened ends 32 and 34 which are in turn mounted to spacer blocks 36 that are integrally formed on the base 18. As is shown better in FIG. 4, each spacer black 36 has an outer face 38 that is used for mounting purposes. The spacer blocks 36 are shaped and oriented in the arrangement shown in FIG. 4 to form several passages 40 in which the radial flexures 22 are positioned and allowed to move without any hindrance. The ends 32 and 34 of these loading flexure assemblies 28 are connected to the spacer blocks 36 by a bolt 42 or other fastening means.

As mentioned above, each loading flexure assembly 28 is connected to an outer end 30 of a radial flexure 22. In the embodiment of FIG. 2 (and shown in greater detail in FIG. 9a), this end 30 of the radial flexure 22 includes a mounting plate 44 that is either integrally formed with the radial flexure or is a separate piece that is either welded or otherwise attached to the flexure 22.

Each mounting plate 44 is attached to the center piece 33 of the loading flexure assembly 28. In FIGS. 2 and 9a, both the center piece 33 and mounting plate 44 have two or more bores 46 through which extends a tensioning bolt or rod 48. A nut 50 located at the end of each rod 48 insures that the center piece 33 and mounting plate 44 will remaining rigidly secured together. This arrangement is just one of the many ways in which the loading flexure assembly can be secured to the radial flexure. Other mounting arrangements will become apparent to those skilled in the art. It is also possible to form the loading flexure assembly and the radial flexure as a separate machined piece thus eliminating the need to rely on a mounting or fastening arrangement to maintain the two elements together.

In operation, each loading flexure assembly is designed to apply an inward radial force on the outer end of the radial flexure. This is simply achieved by moving the ends of the loading flexure assembly toward the center hub. In the embodiment shown in FIG. 2, the ends of the loading flexure assembly are movable in relation to the spacer blocks to vary the amount of radial force that is to be applied to the radial flexure. The bolts that hold the ends of the loading flexure assemblies in place can be simply tightened or "backed off" to achieve the required amount of radial force.

The compressive forces provided by the loading flexure assemblies 28 cause the radial flexures or beam-columns to behave as negative-stiffness mechanisms and provide a negative stiffness at the hub 24 in the vertical direction. At a critical value of the radial compressive force, which corresponds to the critical buckling load of the flexure or beam-column, a point of elastic instability is produced. This point of elastic instability is also the point at which the negative vertical stiffness caused by the radial compressive force just cancels the positive vertical stiffness associated with the flexural deformations of the radial flexure. As the critical value of radial compressive force, or critical buckling load, is approached, the net vertical stiffness of the isolator structure decreases until, at the critical value or point of elastic instability, the net vertical stiffness is zero. Also, the isolator geometry is such that the deflections associated with the mode of instability, or the buckling mode, are substantially vertical displacements, or displacements along the axis of the isolator. Thus, an isolator is produced that can support weight load in its vertical or axial direction, and whose net vertical stiffness can be adjusted to low value which can be made as low as zero or near zero, by adjusting the radial compressive forces on the radial flexures.

Figure 3:
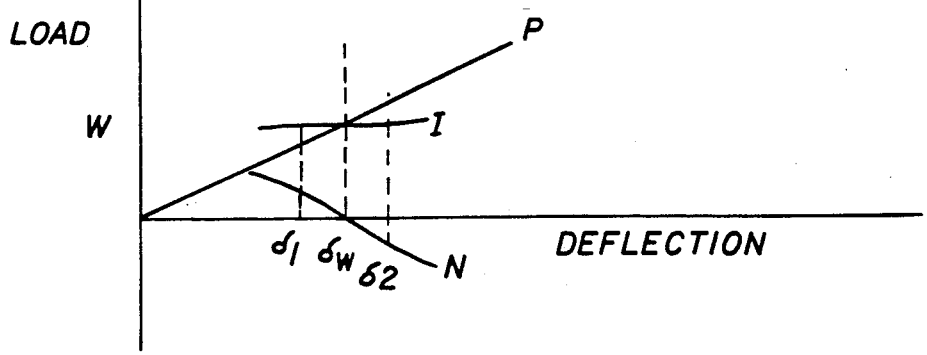
FIG. 3 is a force vs. displacement characteristic for the isolator shown in FIG. 2, illustrating the spring rate or stiffness characteristics of a positive spring means and a negative-stiffness mechanism, and the net effective stiffness for the isolator.
Figure 4:
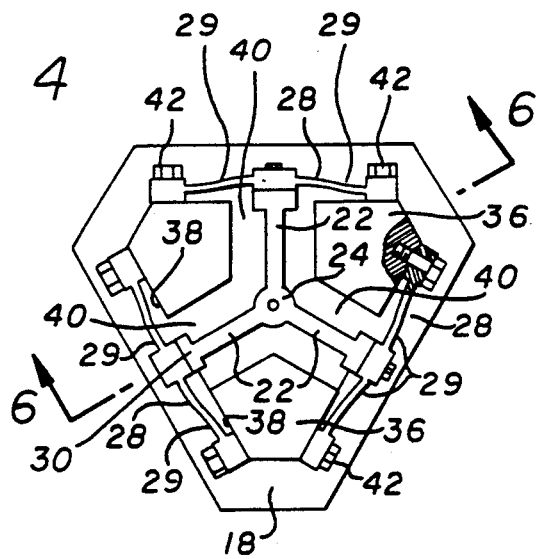
FIG. 4 is a plan view of the isolator shown in FIG. 2 with a partial fragmentary section illustrating the mounting of the loading flexure assembly to the base.
Figure 5:
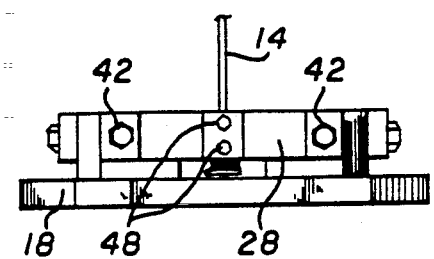
FIG. 5 is a side elevational view of the embodiment shown in FIG. 2.

FIG. 3 shows a load vs. displacement plot which illustrates the equalization principle that produces the low net spring stiffness for the vertical-motion isolator, and in this particular case, near zero stiffness. This plot shows the load-displacement behavior of a typical negative-stiffness mechanism. In FIG. 3, line P depicts the general load-displacement behavior of the spring means while line N depicts the negative-stiffness mechanism. Line I shows the characteristics of the vertical-motion isolator which is merely the combination of the characteristics of the spring means and the negative-stiffness mechanism.

Line P shows a typical linear spring with a positive slope that represents the positive stiffness or spring rate. The spring is deflected an amount $\delta_w$ from its unloaded and undeformed shape, and at deflection $\delta_W$, the spring supports the load W. The deflection $\delta_W$ corresponds to the center point of the over-center or snap-through mechanism that produces the negative stiffness. This is also the position about which the isolator operates to provide vertical-motion isolation. In the isolator of FIG. 2 this corresponds to the position where the inner and outer ends of the radial flexures are approximately the same vertical elevation. This is also illustrated in FIGS. 9A and 9B. FIG. 9B shows a radial flexure 22 in its unloaded and undeformed position. FIG. 9A shows the flexure deformed under the operating weight load to its approximate operating position where the center hub 24 has moved down an amount approximately $\delta_W$. If no radial load were applied to the radial flexures, the load-deflection behavior of the vertical-motion isolator would correspond to line P of FIG. 3 and the stiffness of the isolator would correspond to the slope of line P. As compressive radial load is applied to the radial flexure, negative stiffness is produced which subtracts from the positive stiffness of the positive spring means. For each value of radial load, a negative-stiffness mechanism load-deflection curve could be plotted, such as the curve N of FIG. 3. These curves would have an approximately constant negative slope over a limited range of deflection about the center point. For zero or near-zero vertical stiffness, the design value or operating value for the radial load corresponds to the value at which this negative slope cancels or approximately cancels the positive slope from the positive spring means, as illustrated by the curves of FIG. 3. The isolator is typically designed for a range of deflections over which it can operate efficiently, such as depicted by the range of deflections between $\delta_1$ and $\delta_2$ in FIG. 3. As the isolator deflections increase outside of this range, the negative-stiffness mechanism behavior becomes increasingly nonlinear due to second-order effects from geometry changes associated with the deflections.

It should be appreciated that the isolator is not limited to the operating value of radial load that produces zero or near-zero vertical stiffness. It could be operated at any value of stiffness ranging from the slope of line P of FIG. 3 for zero radial load, to zero or near-zero for the critical value of radial load, to negative values of stiffness for radial loads exceeding the critical value. In fact, if the radial load on the flexure were reversed to load the flexure radially in tension rather than compression the net vertical stiffness of the isolator would be increased above the slope of line P of FIG. 3.

The particular plot shown in FIG. 3 is only for purposes of illustration and is by no means meant to be used as a basis for determining the load-deflection behavior of an actual isolator. It should be apparent that some calculations and experimentation may be necessary in order to determine the proper design parameters and load-deflection values needed to construct a vertical-motion isolator for a particular application. Also, when second-order effects are accounted for, it will become apparent that radial load also affects the flexural deformations of the radial flexures and the vertical position of the central hub, thereby affecting the center point or operating position of the isolator.

It should also be appreciated that the lower the value of net stiffness, the more precise the radial force that is needed to place the negative-stiffness mechanism at its proper operating point. Thus, the particular loading flexure assembly utilized in the embodiment depicted in FIG. 2 may not be sufficiently accurate for certain applications to generate the precise radial force needed to "fine tune" the isolator. As a result, other means providing more precise adjustment of the radial force may be required.

The loading flexure assembly shown in FIG. 2 has the capability for coarse adjustment of the radial force that can be applied to the radial flexure. This is achieved by simply moving the ends of the loading flexure assembly either towards or away from the spacer block on which it is mounted. FIGS. 8a and 8b show a simple arrangement that provides a more rigid attachment between the loading flexure assembly and the spacer block to reduce relative motion and undesirable effects of mechanical friction. It utilizes a number of shims 52 that are clamped between each end of the loading flexure assembly and the face 38 of the spacer block 36 for load adjustment. These shims 52 can be either added or removed prior to assembly in order to vary the amount of force to be applied to the radial flexure assembly. In FIG. 8A, the loading flexure is shown in its unloaded position. In FIG. 8B, the same loading flexure is shown as it applies a substantial force on the radial flexure, due to the deformation of the loading flexure in its clamped position. The minimum incremental adjustment in radial force depends on the minimum individual shim thickness and the stiffness of the loading flexure assembly.

FIG. 10 shows one means for producing a fine adjustment in radial force on the radial flexure. This means is shown as a fine-adjustment mechanism 56 which contacts the center piece 33 of the loading flexure assembly to impart an additional small radial force. This adjustment mechanism 56 includes a supporting mount 58 which supports a screw having a soft spring 62 attached to it. This spring 62 contacts the center piece 33 of the loading flexure assembly. The spring 62 has one end 64 placed within a recess 66 that is specially formed on an outer side 68 of the center piece 33. This recess 66 prevents the spring 62 from moving once the spring is in place and loaded. The opposite end 63 of the spring 62 is placed in a holder 67 that also prevents the spring from moving once loaded. The screw 60 has a knob 70 located at one end to allow the user to move the screw 60 as needed to increase or decrease the additional force on the loading flexure.

Other means can be used to impart a small additional and precisely adjustable force on the loading flexure assembly for fine-tuning purposes. For example, a solenoid or piezoelectric device can be attached between a loading flexure assembly and a support member to produce the additional force, and precision adjustments can be made through precision adjustments in the input electrical current to the device.

The vertical-motion isolation system also includes means for changing the load-carrying capacity of each vertical motion isolator and the position of the payload relative to the base. The isolator of FIGS. 2, 4, 5, 9A, 9B and 10 uses one embodiment for changing load-carrying capacity and payload position. Referring to FIGS. 9A, 9B and 10, this mechanism 72 includes a secondary linear spring 74 and an adjustment screw 76 that are placed directly beneath the central hub 24 to partially support the weight load exerted on the hub. The spring 74 contacts the bottom 78 of the hub 24 to provide an additional upward force on the hub. The spring means for the isolator is now the combined spring of the radial flexures 22 and the secondary spring 74. During operation, the isolator supports a particular weight that causes the spring means to deflect from its initial unloaded position, illustrated in FIGS. 9B and 10, to its loaded center-point or operating position, illustrated in FIG. 9A. A change in weight load causes the springs to deflect, moving the central hub 24 vertically away from the center-point position. Sufficiently small changes in weight load can be tolerated since, in general, there is some net positive spring stiffness and there are finite vertical deflection limits within which the isolator can operate effectively. If the change in weight load is too large, the deflection of the central hub away from the center point can adversely affect the operation and performance of the isolator so the adjustment means 72 is required to adjust for change in weight and central hub vertical position. The adjustment is achieved by raising or lowering the bottom end of the secondary spring 74 via the adjustment screw 76 which is positioned in a threaded bore 80 in the base 18 of the isolator. For example, raising the bottom of the secondary spring 74 allows this spring to carry additional weight while maintaining the central hub at the center point, without affecting the weight load carried by the radial flexures 22. Also, this adjustment does not affect the net vertical stiffness of the isolator since the spring 74 is linear.

The adjustment means for raising or lowering the bottom end of the spring 74 need not be a screw-type mechanism. Any translator such as a piezoelectric translator can be used. Also, the adjustment mechanism 72 need not be a spring and a translator, but can be any mechanism, electrical or mechanical, that will impart an adjustable upward force on the central hub, such as a voice coil, a solenoid or other similar force-producing mechanism. If the change in force applied by this mechanism causes a change in the effective vertical stiffness of this mechanism, then an accompanying adjustment in negative stiffness may be required, by adjusting the radial compressive forces applied to the radial flexures, in order to keep the isolator net vertical stiffness at its desired operating value.

The secondary spring 74 used in the mechanism 72 of FIGS. 9A, 9B and 10 can support any fraction of the total vertical load. The case in which this spring 74 supports all of the vertical load represents another embodiment of the present invention. In this case, the radial flexures 22 contribute to the total positive stiffness but they do not support any of the weight load. Consequently, the radial flexures are unloaded at the center point or operating position of the isolator. This corresponds to the position shown in FIG. 9A, except the flexure 22 is straight since it is not deformed by bending mements from the weight load. Various types of springs can be used for the support spring 74 such as helical springs, rubber springs and pneumatic springs.

The operation of the horizontal-motion isolation system is based upon a theory that by loading each column member isolator to approach its critical buckling load, it will still be stable enough to support the payload weight but will have little, if any, horizontal stiffness. This approach might appear impractical, at first thought, and in fact, might be impractical if it were not for a mechanism, which is also part of the present isolation system, that provides a reasonable safety factor against collapse or excessive deflection that could damage the payload or the isolation system components in the event that the critical buckling load were exceeded. This can be explained with the aid of FIGS. 19A thru 19F. FIG. 19A shows an elevational view of a horizontal-motion isolation system, such as that of FIG. 18. A rigid platform 18 is rigidly connected to and supported on three column members 14 which are rigidly connected to the foundation 144. FIG. 19B shows the approximate deformed shape of the column members resulting from translation of the platform a horizontal distance $\delta_H$. This translation could be caused by a horizontal force on the platform, and it could also be caused by the vertical loads on the column members exceeding their critical buckling loads and causing the column members to buckle or collapse. In other words, the deformation shown also represents the approximate mode of buckling or collapse. In this case, the system would be unstable so that FIG. 19B would represent the deformed shape at one instant in time, and the deformation would continue to increase until complete collapse or failure. If the vertical loads on the columns were below the critical buckling loads, and a horizontal force on the platform caused it to translate as shown in FIG. 19B, then upon removal of the horizontal force the system would restore to its initial shape as in FIG. 19A. If the vertical loads were right at the critical buckling loads, the system would stay in the position shown in FIG. 19A independent of the value of $\delta_H$ for relatively small values of $\delta_H$ and without the application of a horizontal force on the platform. (These conclusions are based on classical theory of elastic stability with the usual assumptions of small deflections, linear elastic behavior, etc.). Thus, when the loads on the columns are equal to their critical buckling loads, the platform can be displaced horizontally without application of a horizontal load, except, of course, to overcome inertia, so that the column-member horizontal stiffness is essentially zero. FIG. 19C shows an individual column member of length L deformed as in FIG. 19B and supporting the critical load $F_{CR}$. The upper end of the column member can displace horizontally but its slope is constrained to the vertical by its rigid connection to the platform 18. From symmetry there is an inflection point or point of zero curvature and zero bending moment at the mid-height 19 of the column member. Also, since, when the column member is loaded to its critical buckling load it can displace horizontally without any horizontal load, the column member at its mid-height 19 supports only the vertical load $F_{CR}$ without bending moment or lateral load. Thus, the critical buckling load of the column member of FIGS. 19B or 19C is equivalent to that of a fixed-free column of length L/2 as shown in FIG. 19D.

Consider, now, that the platform 18 is limited to a small displacement, relative to the column member dimensions, in any horizontal direction by mechanical stops, for example. Under this constraint, in order for one of the column members to buckle and collapse it would have to deform into the approximate shape shown in FIG. 19E, since now the slope of the upper end is constrained to the vertical, and its horizontal displacement is limited to a very small value. Now the buckled shape of the column member has two inflection points 21 and 23 at the approximate locations shown in FIG. 19E. Since, at these inflection points there is no bending moment and no lateral load, the critical buckling load under this condition is approximately equivalent to that of a fixed-free column of length L/4, as shown in FIG. 19F. Since, for a fixed-free column, the critical buckling load is inversely proportional to the square of the column length, the critical buckling load for the column member of FIG. 19E is approximately four times that of the column member of FIGS. 19B or 19C. Thus, any means that limits the horizontal displacements of the upper end of a column member isolator, relative to its lower end, to very small values will provide a substantial safety factor against collapse or damaging overstressing of the member components.

Under normal operation of the present isolation system the horizontal displacements will be small relative to the column member dimensions. Therefore, mechanical stops can be used as a safety factor for unusual upsets that could cause the critical buckling loads to be exceeded, without affecting the normal operation. The stops would allow horizontal displacements larger than those usually experienced during operation, and would still provide a safety factor against collapse or damaging over-stressing. Of course, when the platform or other member is in contact with the stops, performance of the isolator is severely impaired, so a design objective is to prevent "bottom-out" against the stops. For totally passive use of the invention, this requires sufficient margin between the column member critical buckling load and the maximum loads imposed on the column member so that the critical buckling load is not exceeded, except under unusual circumstances. For use of this invention in an active system, displacement sensors would be used with a feed-back control system and means (described below) to provide automatic adjustment of column member critical-buckling loads or adjustment of loads applied to the columns. Corrective forces opposing the motions could also be used in active systems in order to limit displacements. With an active system, the column members could operate at their critical buckling loads or possibly even above their critical buckling loads.

The horizontal-motion isolator can be designed to approach its critical buckling load to whatever extent is needed based on the design requirements and constraints. If space constraints dictate a small isolator height and small column length, and very low stiffness is required, the column can be designed so that the weight it supports closely approaches its critical buckling load. If space constraints are not important, for many applications adequately low stiffness can be achieved with longer columns where the supported weight is a small fraction of the column critical buckling load. This latter design has the advantage that horizontal stiffness is less sensitive to change in weight load.

Figure 7:
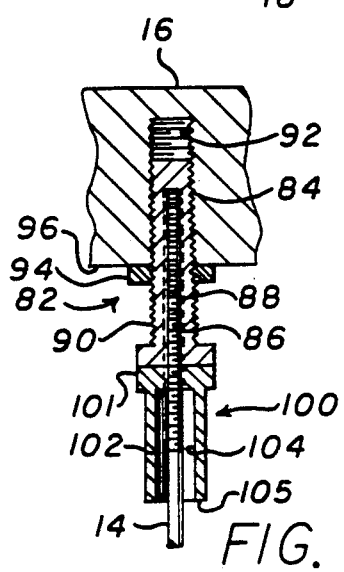
FIG. 7 is a cross-sectional side view of the embodiment shown in FIG. 6 taken along line 7—7.
Figure 6:
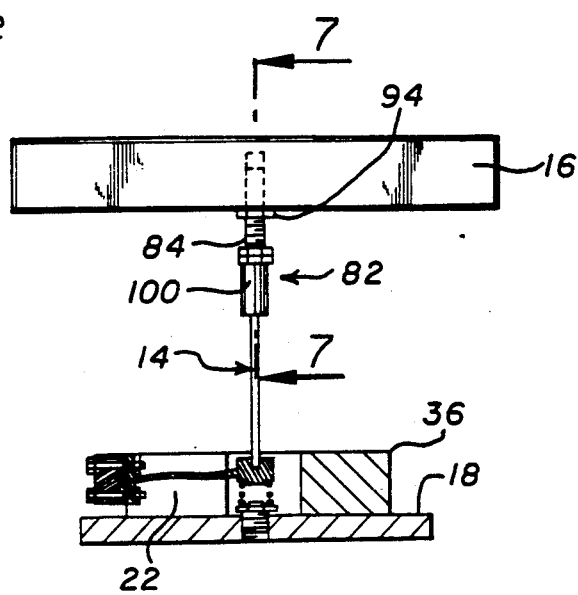
FIG. 6 is a cross-sectional side view of the embodiment shown in FIG. 2.

FIGS. 6 and 7 show a length adjustment mechanism 82 that can effectively change the length and critical buckling load for each column member. This length adjustment mechanism 82 consists of an externally threaded adjustment screw 84 which is threadingly engaged with the end 86 of the column member 14. This adjustment screw 84 has an internal bore 88 which is internally threaded to permit it to be moved along the threaded end 86 of the column member 14. The adjustment screw 84 has an outer surface 90 which is also threaded and is receivable in a threaded bore 92 formed in the platform 16. The adjustment screw 84, as mentioned above, is movable along the end 86 of the column member to permit the effective length of the member to be increased or decreased depending on the placement of this adjustment screw 84. For example, if the adjustment screw is threaded down on the column member, the effective length of the member is decreased. Conversely, as the adjustment screw 84 is moved out along the end of the member, the effective length of the member increases. By manipulating this adjustment screw 84, one can change the effective length so as to provide a means for changing the critical buckling load for a particular column member. Two locking nuts 94 and 101 are provided on this adjustment to create a more rigid attachment between the column member 14 and the platform 16. The locking nut 94 contacts the underside 96 of the platform 16 and the locking nut 101 contacts the underside of the adjustment screw 84.

One of the simplest means for fine-tuning the horizontal-motion isolation system is the addition and removal of weights or "ballast" to and from the payload or payload platform in order to adjust the column member loads to approach their critical buckling loads as closely as desired. A system of stops that limit horizontal deflections can facilitate this fine tuning. Sufficient weight can be added until the system has "buckled" and displaced horizontally against the stops. Then, small increments of weight can be removed until the loads on the column members are slightly below the critical buckling loads, at which point the system will lift off stops. The natural frequency of oscillations of the payload in a horizontal direction, within the allowable displacement limits, can be used to monitor the tuning. The closer the system is to buckling and displacing into the stops, the lower the horizontal stiffness and, hence, the lower the natural frequency.

Figure 20:
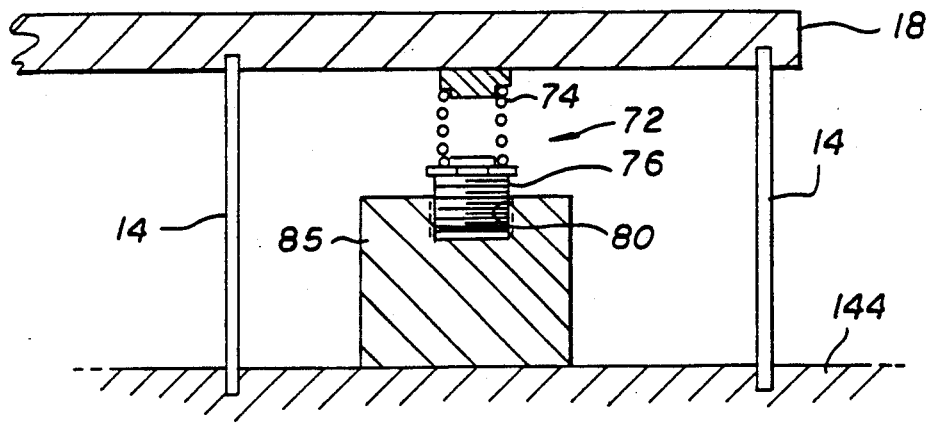
FIG. 20 is a partial cross-sectional side view of an alternative embodiment of a horizontal-motion isolation system, showing means for adjusting the weight loads applied to the column members isolators.

Referring again to FIGS. 19a thru 19c, if the load on an individual column member were above the critical buckling load, the excess load would impart a negative stiffness to the column member in the horizontal direction of the displacement. If the payload platform 18 were partially supported on a secondary spring imparting positive stiffness for any small horizontal displacement, the negative stiffness could be adjusted to substantially cancel the positive stiffness so as to produce low spring rate in any horizontal direction. This is the basis for another embodiment of a horizontal-motion isolation system, and another means for adjusting the system horizontal stiffness, as shown in FIG. 20. A section of a platform 18 supporting a payload (not shown) is supported on column members 14 and a secondary spring 74, which is part of a horizontal stiffness adjustment mechanism 72, similar to that shown in FIG. 10. Here, an adjustment screw 76 is positioned in a threaded bore 80 located in a spacer block 85 attached to foundation 144. Only two column members 14 are shown in FIG. 20. The spring 74 exhibits a positive spring stiffness for displacement of the platform 18 in any horizontal direction. The column members 14 are loaded above their critical buckling loads by the supported weight so as to produce a negative stiffness for displacement of the platform 18 in any horizontal direction. By adjusting the relative weight loads carried by the column members 14 and the secondary spring 74, the negative stiffness from the column members 14 can be made to substantially cancel the positive stiffness from the spring 74 so as to produce low net horizontal stiffness. This adjustment can be made via the adjustment screw 76 which raises or lowers the base of spring 74, thereby causing the spring to carry more or less of the weight load imparted by the platform and thereby adjusting the weight loads carried by the column members 14. The particular arrangement shown in FIG. 20 is just one of numerous combinations that are possible using this principal of the present invention. For example, to provide low net stiffness for translation of the platform in any horizontal direction, as well as for rotation of the platform about a vertical axis through the system center-of-gravity, three pairs of secondary springs with adjustment means 72 and column members 14 could be used to support a platform, such as the platform 135 in FIG. 12. The pairs of secondary springs and column members would be appropriately located, relative to the platform center-of-gravity, in order to satisfy the necessary force and moment conditions. Also, other means could be used to provide adjustable secondary support of the platform or to raise and lower the bottom of spring 74, as discussed previously.

Figure 21:
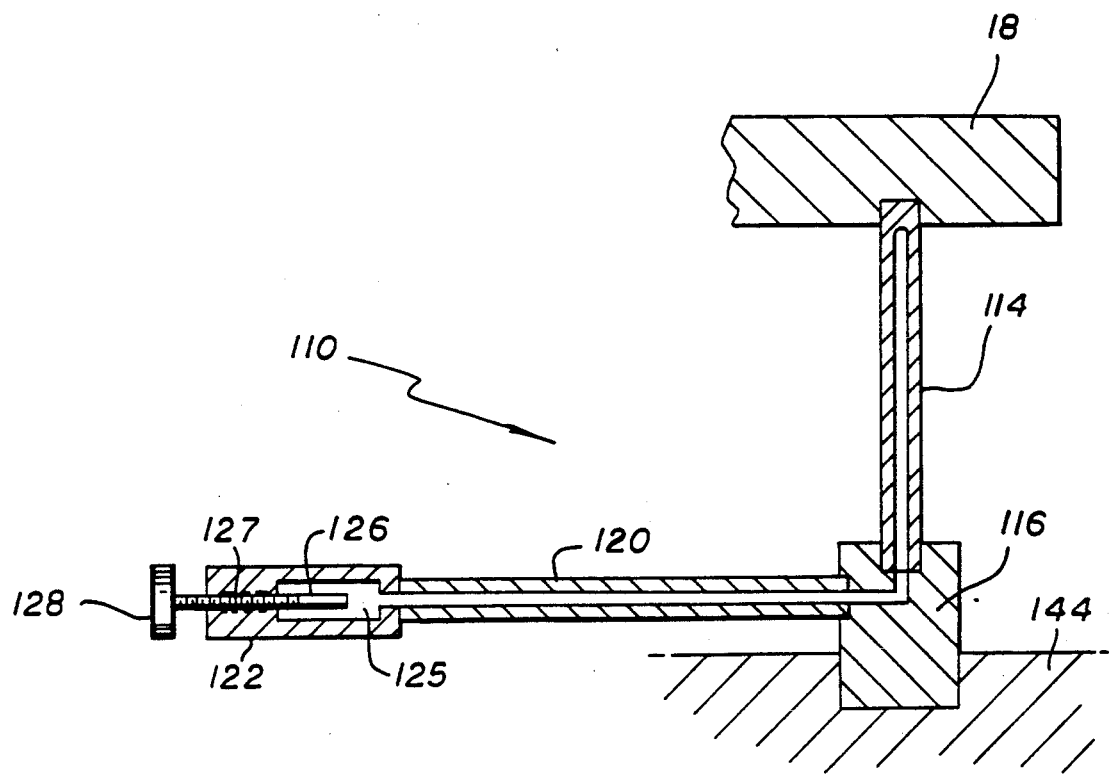
FIG. 21 is cross-sectional view showing alternative means for adjusting the buckling strength of a tubular column member using hydraulic pressure.
Figure 25:
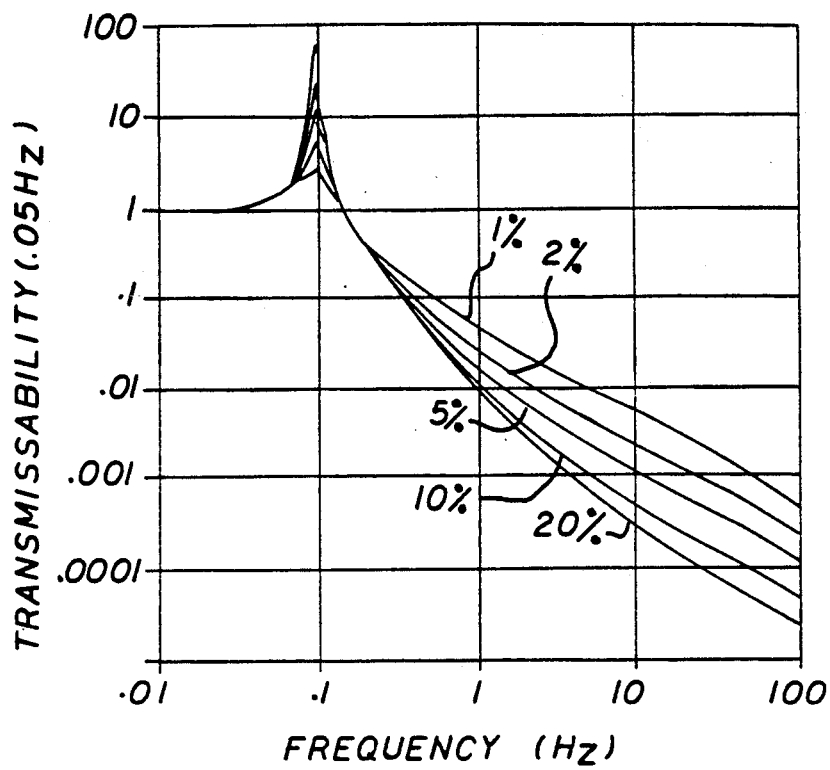
FIG. 25 is a plot of transmissibility vs. frequency ratio curves for an idealized vibration isolation system.
Figure 26:
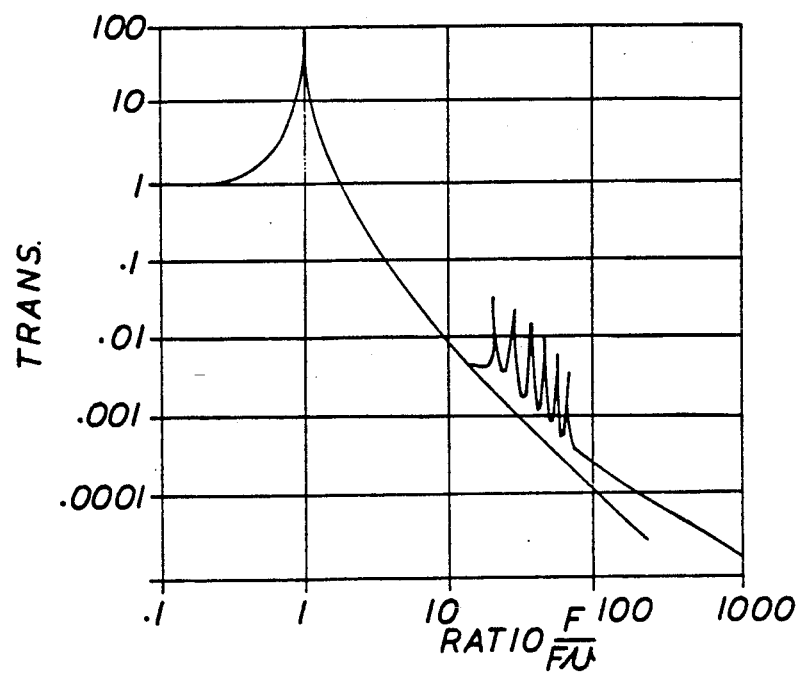
FIG. 26 is a transmissibility curve showing isolator resonance effects, which is typical of a mechanical spring.

FIG. 21 shows an adjustment mechanism 110 for changing the buckling strength of a tubular column member 114, in order to adjust the horizontal stiffness of the column member. The tubular column member 114 is filled with a pressurized hydraulic fluid. The buckling strength of the column member is adjusted by adjusting the hydraulic fluid pressure via the adjustment mechanism 110. This mechanism includes a housing 122, having a piston rod 126 that compresses the hydraulic fluid in the reservoir 125. The housing 122 connects to a hydraulic line 120 which, in turn, connects to a hydraulic fitting 116 that connects to the column member 114, and supports the column member on the foundation 144. The piston rod 126 has a threaded section 127 that threadingly engages a threaded bore in the housing 122, and a knob 128 which can be manipulated by the user to adjust the pressure in the column member 114.

One form of a means to limit horizontal deflections is a stop mechanism 100 which is shown in FIGS. 6 and 7. This stop mechanism 100 is attached to the locking nut 101 and is embodied in a tubular member 102 which partially surrounds the column member 14. This tubular member 102 has an inner diameter which is greater than the diameter of the column member 14 thus providing a limited distance between the two elements. The bottom end 105 of the inner surface 104 of this tubular member 102 is designed to abut against and limit further deformation of the column member as it deforms horizontally during buckling as in FIG. 19B. This stops mechanism 100 is relatively easy to implement, but it does not provide as high a safety factor against collapse as a system of positive mechanical stops.

Figures 11, 12, 13:
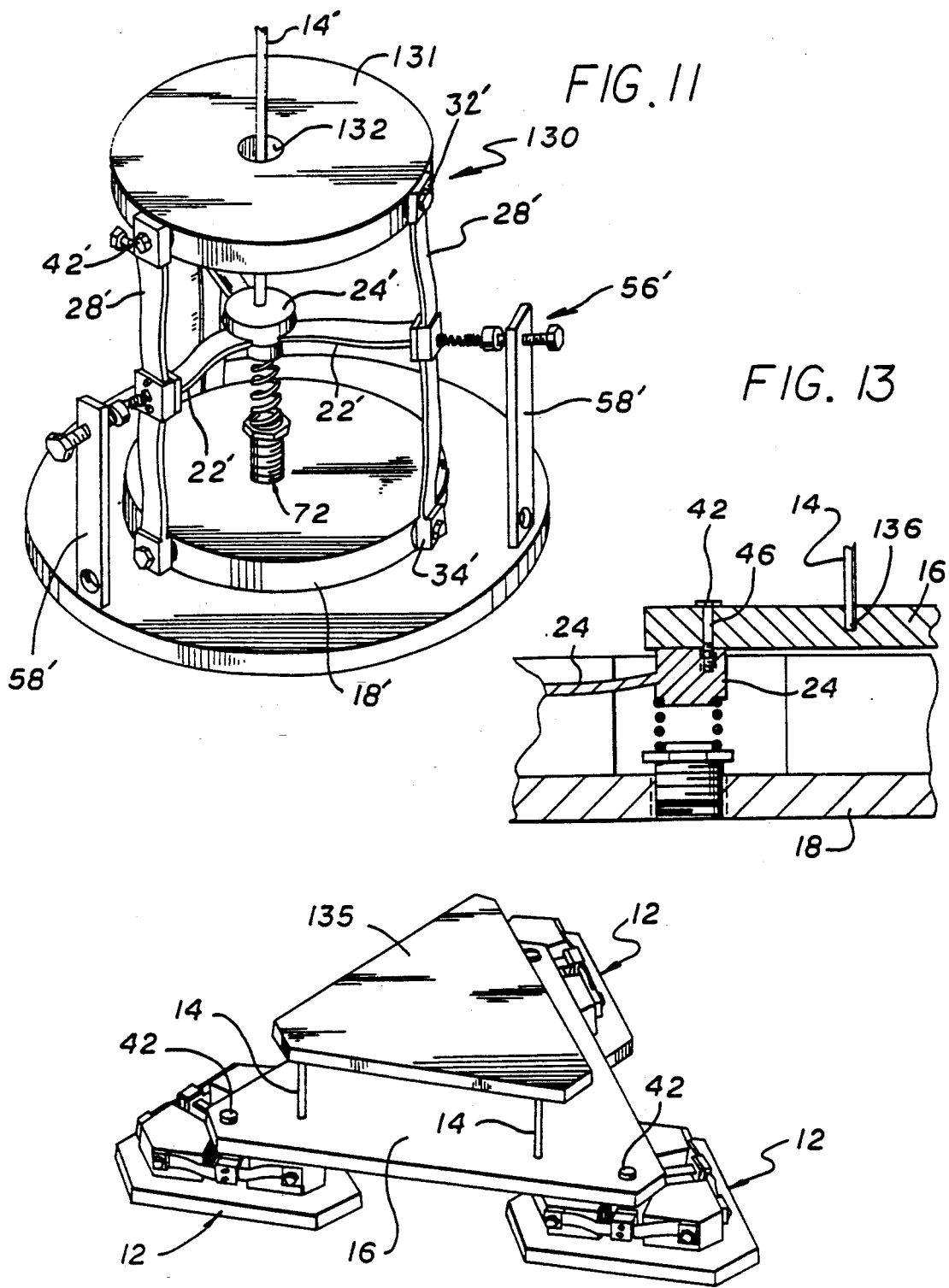
FIG. 11 is a perspective view of another embodiment of a vertical-motion isolator made in accordance with the present invention.
FIG. 12 is a perspective view of another vibration isolation system utilizing three vertical-motion isolators made in accordance with the present invention.
FIG. 13 is a cross-sectional side view showing the attachment of the platform to one of the vertical-motion isolators depicted is FIG. 12.

FIG. 11 shows another embodiment of a vertical-motion isolator 130 made in accordance with the present invention that utilizes similar components as in the vertical-motion isolator described above and shown in FIGS. 1, 2, 4 through 6, 9, and 10, except that the loading flexures in this isolator 130 are vertical, not horizontal. Similar components in this alternative axial isolator are referenced by like numerals except that a prime ("'") has been added to each numeral or character.

The isolator 130 shown in FIG. 11 also includes three radial flexures 22' that are attached at a central hub 24'. Loading flexure assemblies 28' are attached at the ends of the radial flexures 22' for providing radial force. In this particular embodiment, the loading flexure assemblies 28' are vertical and have one end 34' which is attached to a base 18' and the other end 32' attached to a floating spacer block 131. A horizontal-motion isolation member 14' is mounted on the central hub 24' and extends through an opening 132 located on the floating space block 131.

This particular embodiment of the vertical-motion isolator performs in the same fashion as the one shown in FIGS. 1, 2, 4 through 6, 9 and 10 Adjustment mechanisms such as a radial force adjustment mechanism 56' is in contact with the loading flexure assembly 28' to help fine tune the isolator. A similar mechanism 72' which partially supports the center hub is also included for adjusting the load-carrying capacity and center hub vertical position of the isolator.

Figure 15:
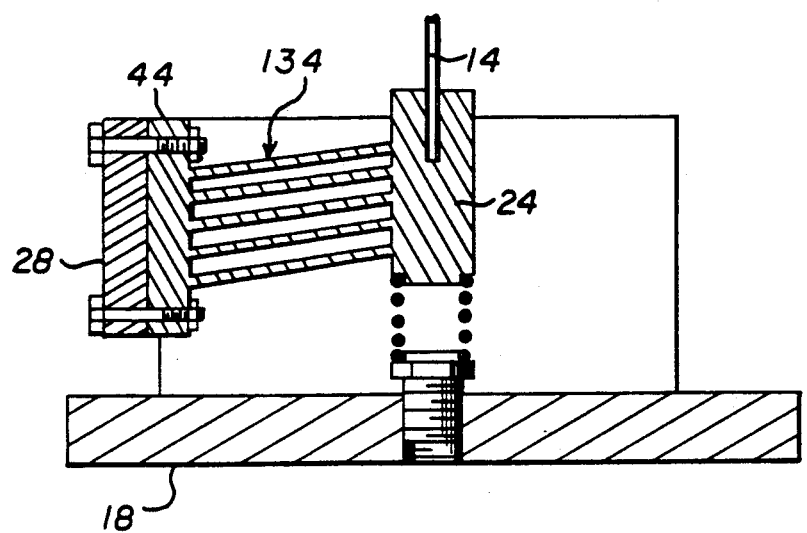
FIG. 15 is an alternative embodiment of the invention which depicts multiple radial flexures that can be implemented in accordance with the present invention.

The vertical-motion isolators shown in FIGS. 2 and 11 are not limited to three radial flexures connected at a central hub and spaced 120 degrees. Only two radial flexures space 180 degrees or more than three radial flexures could also be used, such as four radial flexures spaced 90 degrees or six radial flexures spaced 60 degrees. Referring now to FIG. 15, another embodiment which shows a stack of radial flexures 134 can be used to provide a more compact isolator. These radial flexures are similar to the ones shown in FIGS. 1 and 2 except that the increased number of them can now support greater vertical load. The loading flexure assemblies used in the isolators of FIGS. 2 and 11 can be similarly stacked.

FIGS. 12 and 13 show an alternative vibration isolation system that utilizes the same vertical-motion and horizontal-motion isolators used in the system depicted in FIG. 1. This particular system utilizes three vertical-motion isolators 12 that are used as base supports for directly supporting a platform 16 or similar structure rather than the horizontal-motion isolation members 14. FIG. 13 shows the attachment between this platform and the central hub 24 of one of the isolators. Basically, the platform is mounted on the central hub of each isolator and is simply attached by a bolt 42 or other similar fastening means that extends through a bore 46 in the platform into a threaded bore found on the central hub. The horizontal-motion isolation members 14 are in turn mounted onto this intermediate platform 16 rather than on the central hubs themselves.

In this arrangement bending moments from the horizontal-motion isolators are now transmitted to the platform 16 rather than the central hubs 24 of the vertical-motion isolators. In FIG. 12, each horizontal-motion isolation member 14 is mounted into this intermediate platform 16 and is in contact with an upper platform 135 which supports the isolated object. FIG. 13 shows that the horizontal-motion isolation member can be placed within a mounting hole 136 located on the platform and can be welded or brazed onto the platform. Similarly, the opposite end of the horizontal-motion isolation member can be similarly attached to the upper platform 135.

In the embodiment of FIGS. 12 and 13, as with the embodiment of FIG. 1, the isolation system horizontal-motion force center is some distance below the tops of the columns. In order to achieve optimum performance and to avoid a possible destabilizing effect, the center of mass of the supported object and platform should be located close to this horizontal-motion force center. The approximate location of this horizontal-motion force center $L_{FS}$ relative to the tops of the columns 14 depends in part, on the rocking stiffness of the vertical-motion isolators 12. For the case where the rocking stiffness is very low, $L_{FS}$ is given, approximately, by Equation (1). When the vertical-motion isolator rocking stiffness is very high, tilt of the payload platform is inhibited so that the value of $L_{FS}$ is much less than that given by Equation. (1).

FIG. 18 shows another embodiment of a vibration isolation system 138 which shows the diversity and the number of combinations of components that make up the present invention. In FIG. 18, the horizontal-motion isolation system is utilized as the base support for supporting both the vertical-motion isolator 140 and the object to be isolated (not shown). This system 138 utilizes a single vertical-motion isolator 140 that is similar to the isolator described and shown in FIG. 2 except that the central hub is attached to a support structure 142 on which the object is mounted. This vertical-motion isolator 140 is supported by three horizontal-motion isolation members 14 that are vertically disposed between the base of the isolator 18 and the foundation 144. This system 138 operates similarly as the previously discussed systems only now a single vertical-motion isolator provides the means for isolating the vertical component of the vibration.

Figure 16:
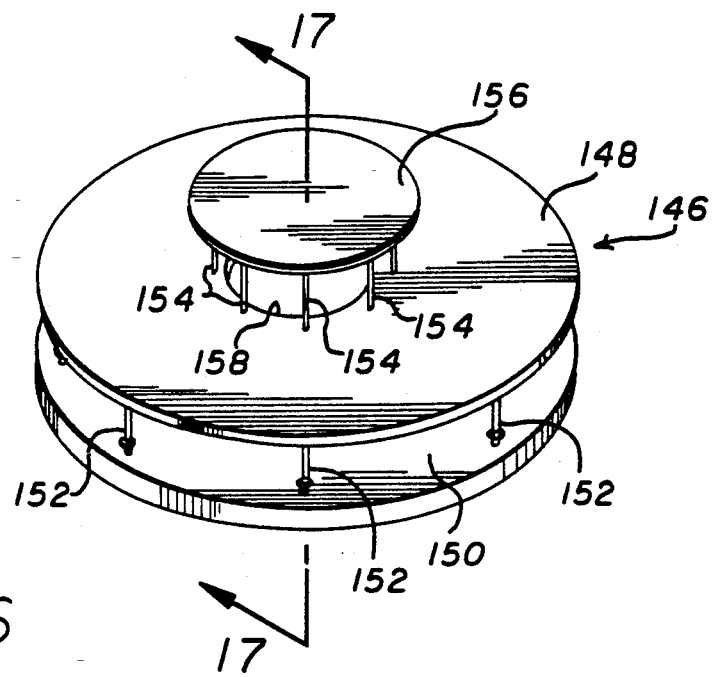
FIG. 16 is a perspective view of a vibration isolation system made in accordance with the present invention which utilizes a coned disk spring.
Figure 17:
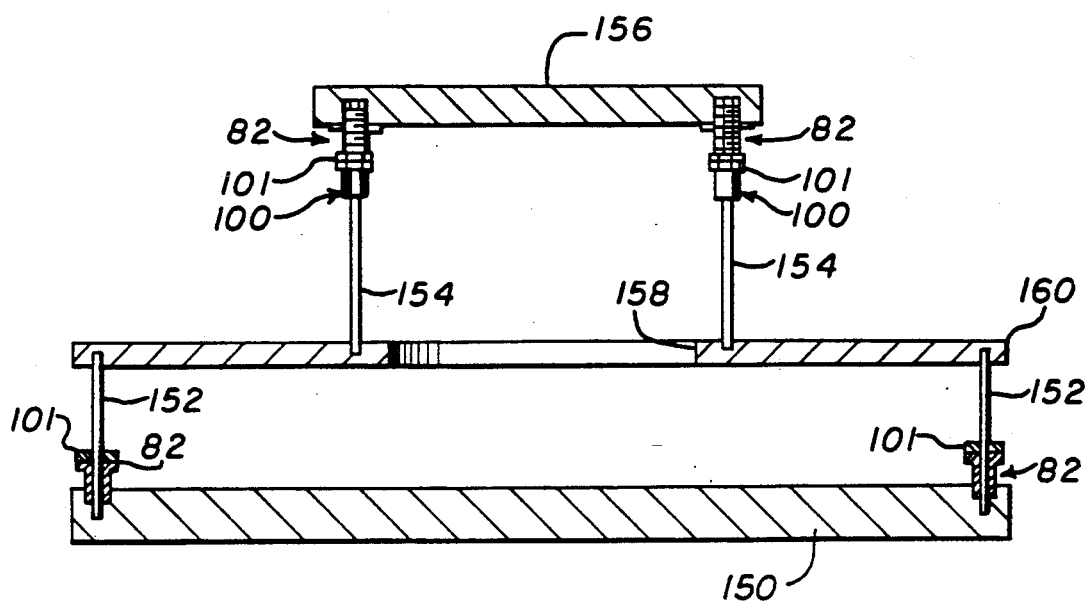
FIG. 17 is a cross-sectional side view of the embodiment shown in FIG. 16 taken along line 17—17.

Still another embodiment of a vibration isolation system 146 is shown in FIGS. 16 and 17. In this particular embodiment, the radial flexures and loading flexure assemblies of the previous systems have been replaced with a convention coned-disk or Belleville spring 148, and two sets of column members. The Belleville spring is a nonlinear spring which is capable of supporting a weight load and exhibiting negative spring stiffness at certain operating points. As was mentioned above, under certain design conditions this Belleville spring behaves as a common snap-through or over-center mechanism that has similar characteristics as the combination of loading flexures and radial flexures used in the other embodiments. This alternative vibration isolation system 146 also utilizes a plurality of column members which support the payload and provide the low stiffness in any horizontal direction. A second set of column members supports the Belleville spring and the payload, and also provides the primary positive vertical-motion stiffness to counteract the negative stiffness generated by the Belleville spring.

Referring to FIGS. 16 and 17, two sets of column members support the Belleville spring 148 between an upper platform 156 and a lower base 150. The upper set of column members 154 is connected to the platform 156 at their upper ends through a length-adjusting mechanism 82, shown in FIGS. 6 and 7 and previously described. The stop mechanism 100 and locking nut 101 are also connected. The lower ends of the column members 154 are attached to the Belleville spring 148 by being inserted into mounting holes and welded or brazed. This upper set of column members 154 transmits the weight load from the upper platform 156 to the Belleville spring close to the inner periphery 158 of the Belleville spring, similar to the manner in which Belleville springs are loaded in the prior art. The lower set of column members 152 is similarly attached to the Belleville spring at their upper ends and near the outer periphery 160 of the Belleville spring 148. The lower ends of the column members 152 are connected to the lower base plate 150 through the same type of length-adjusting member 82 used with the upper column members and with locking nut 101, but without the stop mechanism 100. This lower set of column members 152 transmits the weight load as an upward load close to the outer periphery 160 of the Belleville spring, also similar to the manner in which Belleville springs are loaded in the prior art.

As used here, the Belleville spring is designed to support the weight and provide negative stiffness over a range of vertical deflections about a center point or operating point. This center point corresponds to the loaded and flattened position of the Belleville spring 148, as shown in FIG. 17. As the payload (not shown) and upper support platform 156 displace vertically, the Belleville spring deforms by changing its slope or cone angle, as it does during conventional operation, and the column members 154 and 152 also deform by bending due to the corresponding change in their end slopes.

This bending of the column members provides the positive spring stiffness that counteracts the negative stiffness so as to cause the structure to approach a point of elastic instability and produce the low net stiffness in the vertical direction. The low stiffness in any horizontal direction is produced by adjusting one set of column members, in this case the upper set 154, to be loaded to approach their critical buckling loads. In the embodiment of FIG. 17, the lower column members 152 have the same cross-section and materials as the upper column members 154, but the lower column members are significantly shorter and, hence, much stiffer in bending. As a result, these lower column members 152 provide most of the positive spring stiffness that counteracts the negative stiffness from the Belleville spring.

These lower column members provide another important function in this embodiment of the invention. That function is to provide sufficient lateral bending stiffness to keep the isolator resonant frequencies sufficiently high so they do not degrade the isolation system performance over the frequency range of interest. A particular isolator resonant mode of concern corresponds to the mass of the Belleville spring vibrating horizontally on the springs associated with lateral deflections of the column members. If both the upper and lower column members were loaded at or near their critical buckling loads, the lateral spring constant associated with this isolator resonance would be so low that the isolator resonant frequency would be unacceptably low. By proper design, the lower column members can provide the proper vertical stiffness to counteract the negative stiffness from the Belleville spring and also keep this horizontal isolator resonant frequency at an acceptably high value.

Figure 14:
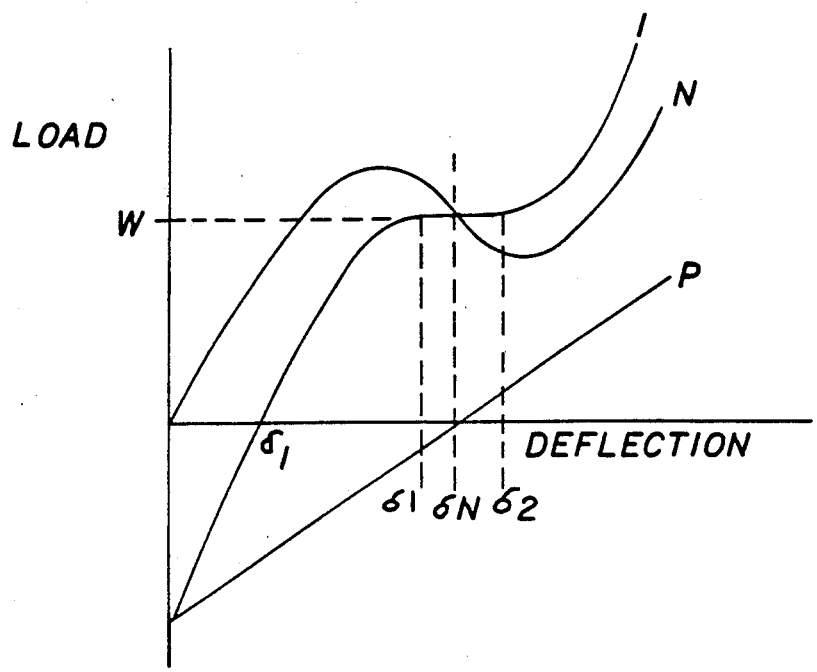
FIG. 14 is a plot of load-deflection curves for the isolator of FIGS. 16 and 17, and its components.

FIG. 14, which is analogous to FIG. 3 for the isolators of FIGS. 2 and 11, shows the vertical load-deflection curve for the isolator of FIGS. 16 and 17 and its components for the particular case of zero or near-zero net isolator stiffness. Curve N corresponds to the nonlinear Belleville spring, line P corresponds to the positive spring associated with bending of the vertical rods, and curve I is the resulting curve for the isolator. The origin corresponds to the unloaded position of the Belleville spring. The deflection $\delta_w$ is the deflection of the Belleville spring from its initial unloaded conical shape (not shown) to its loaded flattened shape shown in FIG. 17 The column members in the embodiment illustrated are initially straight when unloaded and ar attached to the Belleville spring 148 and to the upper platform 156 and the base 150 while the Belleville spring is flattened in an assembly fixture (not shown). to the position and shape shown in FIG. 17. This is why the line P goes through zero load at the deflection $\delta_w$ in FIG. 3, rather than through the origin. When the Belleville spring is released after removal from the assembly fixture, it attempts to return to its initial unloaded conical shape (the origin in FIG. 3) but it is restrained by bending of the column members and can only return to the isolator unloaded position $\delta_0$. The Belleville spring curve N exhibits nearly constant negative slope over a range of deflections from $\delta_1$ to $\delta_2$ about the center point $\delta_w$. This is the operating range of the isolator. When the positive spring line P, due to bending of the column members, is added to the Belleville spring curve N, the resulting isolator load-deflection curve has zero or nearly zero slope over the operating range of deflections from $\delta_1$ to $\delta_2$, about the deflection $\delta_w$, and supports the weight load W.

In this embodiment of the invention, the Belleville spring by itself is loaded by the weight load beyond its point of elastic instability to provide the negative stiffness, and behaves as a "snap-through" or over-center mechanism. By combining the Belleville spring with the positive spring means produced by bending of the vertical rods, the resulting structure can be made stable if the magnitude of the positive stiffness exceeds the magnitude of the negative stiffness. The structure can be made to approach the point of elastic instability by adjusting the magnitude of positive stiffness to approach the magnitude of negative stiffness. The stable position of the unloaded structure is the flattened shape shown in FIG. 17, and the instability mode shape is the deformed shape of the Belleville spring into its conical shape. The displacements of the isolated object associated with the instability are vertical, or in the direction of the axis of the Belleville spring.

The two sets of column member length adjustment mechanism 82 are used for fine-tuning the vertical-motion and horizontal-motion isolation systems. The upper mechanisms, which adjust the lengths of the upper column members 154, primarily fine-tune the horizontal-motion isolation system by adjusting the upper column member critical buckling loads. The lower mechanisms, which adjust the lengths of the lower column members 152, primarily fine-tune the vertical-motion isolation system by adjusting the primary positive vertical spring stiffness which comes from bending of the lower column members. An isolation system weight capacity or payload vertical position adjustment mechanism is not shown in this embodiment, but can be accomplished by other means such as adding or removing ballast weight from the payload or payload platform or by means such as mechanism 72 in FIG. 10.

The isolation system of FIGS. 16 and 17 can also be used as a vertical-motion isolator, in place of the isolator of FIG. 2, in the various isolation system configurations previously described, such as the examples shown in FIGS. 1, 12, and 18. In this case, both the upper and lower column members can be relatively stiff, with length adjustments on only one set, since the horizontal-motion isolation system will be provided by a separate set of column members that can be loaded to approach their critical buckling loads.

The combination of a vertical-motion isolator, such as isolator 12 of FIG. 2, with means having relatively low lateral stiffness such as the column member 14 of FIG. 2, results in another embodiment of a versatile isolator 190 or suspension device that can be used in various orientations, horizontal as well as vertical, to produce another embodiment of an isolation system useful for applications in which the system orientation is changing relative to the gravity field or other acceleration field, or the magnitude of the acceleration field is changing. Examples are the isolation of noisy equipment on a moving submarine, or isolation of an optical pointing system in a moving vehicle. This isolation system would make use of a principle illustrated in FIG. 22 and discussed below. The isolator, or suspension device, such as isolator 190 of FIG. 2, would have the capability of imparting a positive or a negative stiffness in its axial direction (the vertical direction in FIG. 2) and would also have the capability of supporting a force in the axial direction and maintaining a particular axial length of the isolator for variations in this axial force. The axial stiffness and the axial force capability would be adjustable by the various adjustment means previously described. This isolator would also impart a lateral stiffness for isolator deformations causing displacements of one end of the isolator relative to the other end, in directions transverse to the isolator axis (horizontal directions in FIG. 2). This lateral stiffness could be positive or negative, and could also be adjusted by the various means previously described.

FIG. 22 illustrates a principle used in another form of this invention for horizontal-motion isolation. The figure shows the plan view of a payload platform 16 connected to a foundation 144 by three isolators 162. Each isolator has an axis and an axial stiffness $K_A$ associated with small displacements of the isolator in the axial direction, and a lateral stiffness $K_L$ associated with small displacements of the isolator in any lateral direction transverse to the axis of the isolator. The three isolators 162 are disposed so that their axes 166 are spaced 120 degrees apart and intersect at a common point 160. Each isolator 162 in FIG. 22 is depicted by an axial spring $K_A$ and a lateral spring $K_L$, connected between an attaching point 164 on the platform 16 and the foundation 144. The principle illustrated in FIG. 22 is as follows: If the platform 16 is given a small displacement in any horizontal direction, such as the direction indicated by the line 168, the isolation system stiffness K, defined by the magnitude of the resisting force divided by the magnitude of the displacement, has the same value independent of the direction of the displacement, and this value is related to $K_A$ and $K_L$ by the equation.

$$K = 1.5 \, K_A + 1.5 \, K_L \tag{2}$$

This principle is utilized in one embodiment of the present invention by configuring an isolation or suspension system as shown in FIG. 22 with the isolators previously described, in this case with adjustable negative stiffness in the axial direction and fixed positive stiffness in the lateral direction. Substituting this negative stiffness, denoted by $-K_N$, for $K_A$ in Equation (2) gives the result $$K = -1.5 \, K_N + 1.5 \, K_L \tag{3}$$

This equation indicates that the uniform omni-direction stiffness for the resulting horizontal-motion isolation system can be made arbitrarily small by adjusting the magnitude of the negative axial stiffness $K_N$ to approach the magnitude of the positive lateral stiffness $K_L$. The point at which they become equal is a point of elastic instability for the resulting structure. Also, although the physical structure is not truly axi-symmetric, the resulting stiffness behavior is axi-symmetric and the resulting instability behavior is also axi-symmetric, that is, theoretically there are an infinite number of instability mode shapes that can occur in an infinite number of horizontal directions.

Since, further, the isolators can be adjusted to maintain their axial length for varying axial load, the horizontal-motion isolation system configuration described above can be used for applications in which the orientation of the system is changing relative to the gravity field, or other acceleration field, or the magnitude of the acceleration filed is changing, as in the case of isolating noisy equipment in a moving submarine. Referring to FIG. 22, by appropriately adjusting the load support capability of the individual isolators 162 in the system, the payload platform 16 can be maintained in a equilibrium position relative to the foundation 144 in the presence of steady or quasi-steady horizontal accelerations of the foundation, while keeping the horizontal stiffness of the isolation system arbitrarily low. This approach would usually be used in an active isolation system. For the system shown in FIG. 22, the intersection point 160 of the isolator axes would correspond to the center-of-mass of the suspended object in order to avoid translational-rotational coupling, that is, rotational accelerations of the object produced by translational accelerations of the foundation.

If the horizontal-motion isolation system of FIG. 22 were used with a vertical-motion isolation system having a uniform omnidirectional horizontal stiffness $K_H$, the negative axial stiffness of the horizontal-motion isolators 162 could be adjusted to cancel this stiffness $K_H$ as well as the lateral stiffness $K_L$ of the horizontal-motion isolators. Adding the stiffness $K_H$ to Equation (3) gives $$K = -1.5 \, K_N + 1.5 \, K_L + K_H \tag{4}$$

In order for the net horizontal stiffness of the system to be reduced to zero, the required value of $K_N$ would be $$K_N = K_L + \tfrac{2}{3} K_H \tag{5}$$

This results from setting K equal to zero in Equation (4) and solving for $K_N$.

The vertical-motion isolation system could be comprised of isolators of the same type as those used for the horizontal-motion system, except their load capacity would be adjusted to support the vertical weight load of the suspended object. The positive spring means of the vertical-motion isolation system would now include the lateral stiffness (in the vertical direction) of the horizontal-motion isolators, so the net axial negative stiffness of the vertical-motion isolators would have to be adjusted to cancel this lateral (vertical) stiffness, of the horizontal-motion isolators. The vertical-motion isolation system used with the horizontal-motion isolation system of FIG. 22 could be essentially the same as the system 10 of FIG. 1, except the column members 14 shown in FIGS. 1 and 2 could be designed to operate below their critical buckling loads and would not require the length adjustment mechanism 82 since the stiffness of the horizontal-motion isolation system would be adjusted by adjusting the negative axial stiffness of the horizontal-motion isolators 162 of the horizontal-motion isolation system of FIG. 22.

The isolation system comprising the horizontal-motion isolation system of FIG. 22 and the vertical motion isolation system of FIG. 1, as previously described, is only one embodiment of a system comprising versatile isolators of the type previously described, an example of which is isolator 190 of FIG. 2. Many more variations would be obvious to one skilled in the art.

FIGS. 23 and 24 show another embodiment of the invention that provides a compact horizontal-motion isolation system that is based on the principle illustrated in FIG. 22 and described above. FIG. 23 shows an elevational view of the isolation system 186 A payload platform 16 is supported over a base 18 by three double-flexure assemblies 170. FIG. 24 shows a cross-sectional plan view of the double-flexure assemblies 170 and the base 18. Each double-flexure assembly 170 comprises an upper flexure 172, a lower flexure 174, an upper plate 176, a middle plate 178 and a lower plate 180. The upper flexure 172 is connected between plates 176 and 178, and the lower flexure 174 is connected between plates 178 and 180. The upper flexure 172 is crossed with the lower flexure 174, that is, the flexures are rotated 90° about a vertical axis. The flexures 172 and 174 are thin flexible plates that have low stiffness that permits the upper connecting plates to translate relative to the lower connecting plates in directions perpendicular to the planes of the flexures. The upper plates 176 of the flexure assemblies 170 are welded to the payload platform 16 and the lower plates 180 are welded to the base 18. The constraints imposed on the flexures 172 and 174 in the isolation system 186, combined with their low bending stiffnesses result in two low horizontal stiffnesses for each flexure assembly 170 that are 90° apart, analogous to the axial stiffness $K_A$ and the lateral stiffness $K_L$ of the isolators 162 in FIG. 22. By orienting the three flexure assemblies 170 with their low stiffness directions 120° apart, as indicated in FIGS. 23 and 24, the resulting low isolation system stiffness is the same for any horizontal direction, according to the principle illustrated in FIG. 22. Also, each flexure has a critical buckling strength and a buckling or instability mode similar to that of the column members shown in FIGS. 19b and 19c. Therefore, the stiffness of the horizontal-motion isolation system 186 can be made low by loading the flexure assemblies 170 with the payload weight to approach their critical buckling strengths. The means shown in FIG. 20 and previously described for adjusting the column loads can also be used to adjust the flexure assembly loads.

Each flexure assembly 170 could be machined from a single piece. Also, other means besides welding could be used to attach the flexure assemblies to the payload platform 16 and a base 18, such as bolting.

As indicated previously, the vibration isolation system provided by this invention can be used passively, or with motion-sensing elements, a feed-back loop and actuating means so it can be used as an active isolation system. All of the adjustment means previously described can be operated electrically. For example, all screw-type actuators can be powered by electrical motors or, in some cases, replaced by electrical translators such as piezoelectric translators or solenoids. The motion-sensing elements can be accelerometers mounted on the payload or payload platform and on the base or foundation, or displacement transducers mounted between the payload or payload platform and the base or foundation to measure relative motions. Another means of sensing relative motions between the payload and the base is through the use of strain gages mounted on the spring means, such as the radial flexures. These could be configured to measure bending strain, which could be calibrated against axial displacement of the central hub. Various control functions could be used in the feed-back loop in order to limit the response of the payload and keep the relative displacements within acceptable limits. A feed-back loop could also be used to optimize the spring rate adjustment, such as the fine-tuning load on a loading flexure, in order to minimize the payload acceleration response.

The various components that make up the embodiments of the present invention can be made from a number of suitable materials. For example, structural metals such as steel and aluminum alloys, non-metallics, and other structural materials that have appropriate elastic and strength properties could be suitable for use. Due to the sensitivity of the isolation apparatus itself, in some embodiments, the same material should be used for the base structures and other components, such as loading flexures and radial flexures, since the device can be very temperature sensitive. For example, if different materials are used for different components, variations in the thermal expansion coefficients can cause the components to expand differently when subjected to a temperature change. As a result, unwanted strain on some of the extremely sensitive components can detrimentally affect the system. Materials with low coefficients of thermal expansion, such as Invar, can be used to minimize temperature effects.

While several particular forms of the invention have been illustrated and described, it will be apparent that various modifications can be made without departing from the spirit and scope of the invention. Accordingly, it is not intended that the invention be limited, except as by the attached claims.

What is claimed is:

1. An omnidirectional vibration-isolating suspension system for supporting an object having mass in an acceleration field and maintaining the object in an equilibrium position relative to a base while suppressing transmission of vibratory motion between the object and base, comprising:

a first isolator including a first elastic structure having first and second ends spaced apart to define an axial direction, said first elastic structure having transverse stiffness in response to displacement of said first end relative to said second end in any direction substantially transverse to the axial direction without rotation of said second end and stiffness in the axial direction to support the object, said first elastic structure having a point of elastic instability in response to loading in the axial direction where at the point of elastic instability said first elastic structure has substantially zero transverse stiffness, said first elastic structure being loaded in the axial direction to approach its point of elastic instability to cause a substantial reduction of the transverse stiffness while maintaining sufficient axial stiffness to support the object; and a second isolator operatively connected axially in series with said first isolator, said second isolator including a second elastic structure adapted to receive a compressive loading force, said second elastic structure having an end for supporting the object and axial stiffness, said second elastic structure having a point of elastic instability in response to application of a compressive loading force to said second elastic structure where at the point of elastic instability said second elastic structure has substantially zero axial stiffness, said second elastic structure being loaded to approach its point of elastic instability to cause a substantial reduction of its axial stiffness, wherein said first and second isolators have load-supporting capability to support the object in the axial direction and are connected between the object and base.

2. The system as defined in claim 1 further including means for adjusting the transverse stiffness of said first elastic structure and means for adjusting the axial stiffness of said second elastic structure.

3. The system as defined in claim 1 further including means for adjusting the load-supporting capability of said second isolator while maintaining the equilibrium position of the system, wherein the load is caused by supporting the object in the acceleration field.

4. The system as defined in claim 2 wherein said means for adjusting the transverse stiffness comprise means for adjusting the buckling strength of said first elastic structure.

5. The system defined in claim 2 wherein said means for adjusting the axial stiffness of the second elastic structure comprise means for adjusting the compressive loading force on said second elastic structure.

6. The system as defined in claim 1 wherein the axial loading of said first elastic structure is caused by supporting the object in the acceleration field.

7. The system as defined in claim 1 wherein said first elastic structure comprises at least one column.

8. The system as defined in claim 1 wherein said first elastic structure comprises at least one beam-column.

9. The system as defined in claim 1 wherein said second elastic structure comprises at least one beam-column oriented substantially transverse to the axial direction.

10. The system as defined in claim 1 wherein said second elastic structure comprises at least one coned-disk spring.

11. The system as defined in claim 4 wherein said first elastic structure comprises at least one column and said means for adjusting the buckling strength comprise means for changing the length of said column.

12. The system as defined in claim 4 wherein said first elastic structure comprises at least one pressurized tubular column and said means for adjusting the buckling strength comprise means for adjusting the pressure.

13. The system as defined in claim 5 further including a deformed third elastic structure operatively connected with said second elastic structure for applying the compressive loading force to said second elastic structure, wherein said means for adjusting the compressive loading force on said second elastic structure comprise means for adjusting the deformation of said third elastic structure.

14. The system as defined in claim 13 wherein said third elastic structure comprises at least one flexure.

15. The system as defined in claim 5 further including means for adjusting the axial load on said first elastic structure comprise:
   a secondary supporting means adapted to partially support the object in the axial direction; and
   means for adjusting the amount of load carried by said secondary supporting means.

16. The system as defined in claim 15 wherein said secondary supporting means comprise a spring having one end operatively connected to the object and another end operatively connected with the base and said means for adjusting the amount of load carried by said secondary supporting means comprise means for adjusting the relative position of the ends of said spring.

17. The system as defined in claim 3 wherein said means for adjusting the load-supporting capability of said second isolator comprise:
   support means having one end operatively connected to the object and the other end operatively connected to the base, said supporting means supporting at least a portion of the object in the axial direction; and
   means for adjusting the relative position of said ends of said supporting means.

18. The system as defined in claim 17 wherein said supporting means comprise a spring.

19. The system as defined in claim 1 further including means operatively associated with said first elastic structure for limiting displacements of the object about the equilibrium position relative to the base.

20. The system as defined in claim 1 further including means for adjusting the load-supporting capability of said first isolator.

21. The system as defined in claim 1 further including means for lowering the center of mass of the object.

22. An omnidirectional vibration-isolating suspension system for supporting an object in an equilibrium position relative to a base while suppressing transmission of vibratory motion between the object and the base comprising:
   at least one composite suspension apparatus connected between the object and the base, comprising:
   a first suspension device having first and second ends spaced apart to define an axial direction, said first suspension device having force-supporting capability in the axial direction for supporting the object and relatively low stiffness in a direction lateral to the axial direction; and
   a second suspension device operatively connected axially in series with said first suspension device, said second suspension device including:
   spring means adapted to provide positive stiffness in the axial direction and having force supporting capability in the axial direction for supporting the object; and
   means for producing negative stiffness operatively connected with said spring means wherein said spring means and said negative-stiffness-producing means combine to produce low axial stiffness of the second suspension device which is the algebraic sum of the positive and negative stiffnesses.

23. The system as defined in claim 22 further including means for adjusting the next axial stiffness of said second suspension device.

24. The system as defined in claim 23 wherein said adjusting means comprise means for adjusting the negative stiffness of said negative-stiffness-producing means.

25. The system as defined in claim 22 further including means for adjusting the net axial force-supporting capability of said second suspension device while maintaining the equilibrium position.

26. The system as defined in claim 23 wherein said adjusting means comprise means for adjusting the positive stiffness of said spring means.

27. The system as defined in claim 25 wherein said force-adjusting means comprise means for adjusting the position of one end of said spring means relative to the other end.

28. The system as defined in claim 22 wherein three of said composite suspension apparatus are disposed so that the axes defined by the axial direction of each of said first suspension devices lie in a plane and intersect at a common point and are spaced 120° apart.

29. The system as defined in claim 28 further including at least one additional suspension apparatus connected between the object and the base and disposed so that the axis defined by the axial direction of said additional suspension apparatus, is perpendicular to the plane defined by the axes of the other suspension apparatus.

30. The system as defined in claim 22 further including means for lowering the center of mass of the object.

31. A method for reducing transmission of vibrations having a component in an axial direction and any direction lateral to the axial direction between an object and a base, comprising the steps of:

supporting the object relative to the base on a composite suspension apparatus including a first isolating device having first and second ends spaced apart in an axial direction and having sufficient axial stiffness to support the object and relatively low stiffness in any lateral direction and a second suspension device axially in series with the first isolating device and having spring means which exhibit positive axial stiffness to support the object; and applying negative stiffness between the object and the base for counteracting the positive axial stiffness of said spring means.

32. In a vibration-isolating system utilizing a uniaxial apparatus for suppressing the transmission of vibratory motion having a component in an axial direction between an object and a base, the improvement comprising:

at least one elastic member connected to the uniaxial apparatus, each elastic member having a first end and second end spaced apart in the axial direction and having sufficient axial stiffness to support the object and low stiffness in any direction transverse to the axial direction for suppressing transmission of any vibratory motion transverse to the axial direction, the uniaxial apparatus and elastic member being disposed between the object and the base.

33. A vibration-isolating suspension system for supporting an object in an equilibrium position relative to a base while suppressing the transmission of vibratory motion between the object and the base, comprising:

a plurality of elastic members disposed between the object and the base, each elastic member having a first end and a second end spaced apart to define an axial direction, each of said members having axial stiffness to support the object and transverse stiffness in response to the displacement of said first end relative to said second end in any direction substantially transverse to the axial direction without rotation of said second end, each elastic member having a point of elastic instability in response to loading in the axial direction where at the point of elastic instability each member has zero or near zero transverse stiffness, each elastic member being loaded in the axial direction to approach its point of elastic instability to cause substantial reduction of the transverse stiffness of each member.

34. The system as defined in claim 33 wherein said elastic members comprise columns.

35. The system as defined in claim 33 further including means for adjusting the transverse stiffness of each elastic member.

36. The system as defined in claim 35 wherein said means for adjusting the transverse stiffness of said elastic member comprise means for adjusting the buckling strength of each elastic member.

37. The system as defined in claim 36 wherein said means for adjusting the buckling strength comprise means for changing the length of said elastic member.

38. The system as defined in claim 33 further including means for adjusting the load-supporting capability of said elastic members.

* * * * *